US011137128B2

(12) United States Patent
Fleszewski et al.

(10) Patent No.: US 11,137,128 B2
(45) Date of Patent: Oct. 5, 2021

(54) WARNING DEVICES WITH OSCILLATING LIGHT PATTERNS

(71) Applicant: Federal Signal Corporation, Oak Brook, IL (US)

(72) Inventors: Vincent S. Fleszewski, Crown Point, IN (US); Jeffery M. Loftus, Tinley Park, IL (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 16/826,834

(22) Filed: Mar. 23, 2020

(65) Prior Publication Data

US 2020/0309341 A1    Oct. 1, 2020

Related U.S. Application Data

(60) Provisional application No. 62/827,781, filed on Apr. 1, 2019.

(51) Int. Cl.
*F21S 43/40* (2018.01)
*F21V 5/00* (2018.01)
(Continued)

(52) U.S. Cl.
CPC .............. *F21S 43/40* (2018.01); *F21S 10/00* (2013.01); *F21V 5/007* (2013.01); *F21V 5/02* (2013.01); *F21V 7/0083* (2013.01); *H05B 45/3725* (2020.01); *F21Y 2105/16* (2016.08); *F21Y 2115/10* (2016.08)

(58) Field of Classification Search
CPC ........... F21S 43/40; F21S 10/00; F21V 5/007; F21V 7/0083; F21V 5/02; F21Y 2105/16; F21Y 2115/10; B60Q 1/2611; B60Q 1/18; H05B 45/3725
See application file for complete search history.

(56) References Cited

U.S. PATENT DOCUMENTS 1,991,101 A    2/1935 Kennelly
2,132,392 A    10/1938 Chalker
(Continued)

FOREIGN PATENT DOCUMENTS

DE    10 2010 014 289 A1    10/2011
EP    2 199 661 A2    6/2010
(Continued)

OTHER PUBLICATIONS

Extended European Search Report for Application No. 17174099.6 dated Oct. 6, 2017, 8 pages.
(Continued)

*Primary Examiner* — Kevin Quarterman
(74) *Attorney, Agent, or Firm* — Merchant & Gould P.C.

(57) ABSTRACT

A warning device. In some embodiments, the warning device can include: a plurality of light sources forming an array; a plurality of reflectors, with at least one reflector being associated with each of the plurality of lights; and a plurality of lenses, with at least one lens being associated with each of the plurality of lights. In some examples, each of the plurality of reflectors and the plurality of lenses is tilted along a principal axis to collimate light and to direct the light from one of the plurality of lights to one of a plurality of far field light spots.

9 Claims, 26 Drawing Sheets

(51) Int. Cl.
*F21V 7/00* (2006.01)
*F21V 5/02* (2006.01)
*F21S 10/00* (2006.01)
*H05B 45/3725* (2020.01)
*F21Y 105/16* (2016.01)
*F21Y 115/10* (2016.01)

(56) References Cited

U.S. PATENT DOCUMENTS

| | | | |
|---|---|---|---|
| 2,677,121 | A | 4/1954 | Heehler |
| 3,908,179 | A | 9/1975 | Heehler et al. |
| 4,733,335 | A | 3/1988 | Serizawa et al. |
| 5,490,049 | A | 2/1996 | Montalan et al. |
| 5,580,156 | A | 12/1996 | Suzuki et al. |
| 6,283,613 | B1 | 9/2001 | Schaffer |
| 6,554,451 | B1 | 4/2003 | Keuper |
| 8,047,676 | B2 | 11/2011 | Cheng et al. |
| 2004/0208018 | A1 | 10/2004 | Sayers et al. |
| 2007/0097700 | A1 | 5/2007 | Pederson |
| 2010/0039812 | A1 | 2/2010 | Cheng et al. |
| 2010/0157589 | A1 | 6/2010 | Czajkowski et al. |
| 2010/0195330 | A1 | 8/2010 | Schaefer et al. |
| 2011/0012746 | A1 | 1/2011 | Fish, Jr. et al. |
| 2012/0092863 | A1 | 4/2012 | Krijn et al. |
| 2012/0230044 | A1 | 9/2012 | Zhang et al. |
| 2012/0281418 | A1 | 11/2012 | Eckert et al. |
| 2012/0319871 | A1 | 12/2012 | Wise |
| 2014/0268845 | A1 | 9/2014 | Davis |
| 2014/0299897 | A1 | 10/2014 | Zhang et al. |
| 2015/0035440 | A1* | 2/2015 | Spero ............... F21S 41/153 |
| | | | 315/153 |
| 2015/0062917 | A1 | 3/2015 | Yin |
| 2017/0116864 | A1 | 4/2017 | Zarnowski et al. |
| 2017/0350573 | A1* | 12/2017 | Fleszewski ............ F21V 5/04 |
| 2019/0069677 | A1 | 3/2019 | Scharer et al. |

FOREIGN PATENT DOCUMENTS

| | | |
|---|---|---|
| EP | 2 995 852 A1 | 3/2016 |
| WO | 01/09859 A1 | 2/2001 |
| WO | 01/16524 A1 | 3/2001 |
| WO | 2010/103477 A1 | 9/2010 |

OTHER PUBLICATIONS

European Examination Report for Application No. 17174099.6 dated Dec. 11, 2018, 4 pages.

European Examination Report for Application No. 17174099.6 dated Jun. 24, 2019, 5 pages.

* cited by examiner

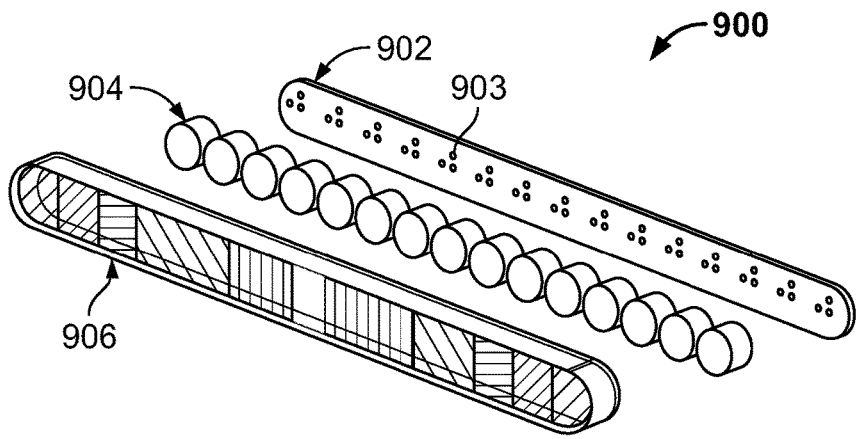
FIG. 9
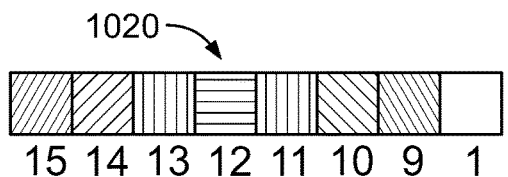
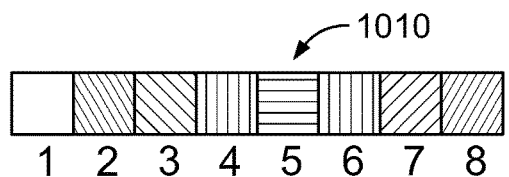
FIG. 10
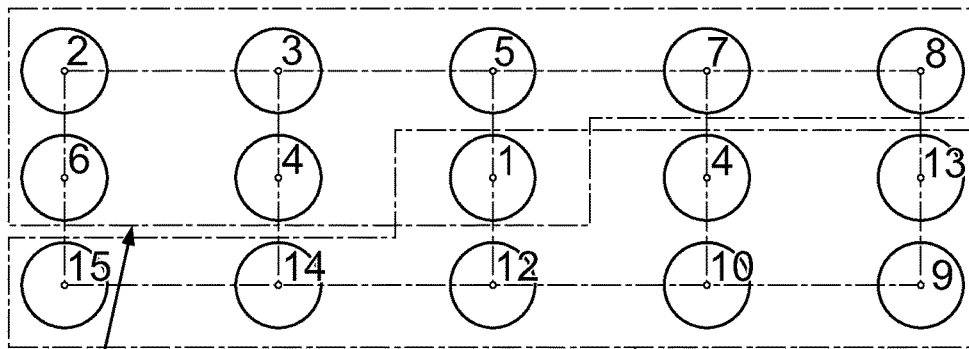
FIG. 11

NAVIGATOR Pattern Select

WARNING DEVICES WITH OSCILLATING LIGHT PATTERNS

RELATED APPLICATION(S)

This patent application is related to U.S. patent application Ser. No. 15/608,019 filed on May 30, 2017, the entirety of which is hereby incorporated by reference.

BACKGROUND

Warning devices that use mechanical mechanisms to produce oscillating light patterns have been used on emergency vehicles. While these types of warning devices can be effective, they are inherently expensive and their reliability suffers due to the mechanical components used to produce the oscillating motion.

Further, the mechanical linkages used to create the oscillating light patterns could be adjusted to produce different oscillating warning light patterns. The warning device would need to be taken out of service and disassembled to perform adjustments and create different warning patterns.

SUMMARY

In one example aspect, a warning device can include: a plurality of light sources forming an array; a plurality of reflectors, with at least one reflector being associated with each of the plurality of lights; and a plurality of lenses, with at least one lens being associated with each of the plurality of lights; wherein each of the plurality of reflectors and the plurality of lenses is tilted along a principal axis to collimate light and to direct the light from one of the plurality of lights to one of a plurality of far field light spots.

DESCRIPTION OF THE DRAWINGS

FIG. 9 is another example warning device including a linear array of light sources.

FIG. 10 is another example warning device including two linear arrays of light sources.

FIG. 11 is an example array of light spots in the far field from the warning device of FIG. 10.

DETAILED DESCRIPTION

The present disclosure is directed to warning devices, such as those used on emergency vehicles, that create various light patterns without using mechanical mechanisms to do so.

In such examples, the warning device(s) can be typically located on the front of an emergency vehicle and produce the far field light spot pattern perpendicular to the direction of vehicle motion. In such an example, the 3 on-axis far field light spots (located on the H axis depicted in FIG. 1) would be in line with preceding vehicles in the lane in which the emergency vehicle is traveling. They would provide a warning signal to these vehicles (through their rear view mirrors) that an emergency vehicle calling for the right of way was behind them. The other far field light spots (located on the axes 20° L, 10° L, 10° R, and 20° R depicted in FIG. 1) would align with the vehicles in adjacent lanes of traffic and would provide a warning signal to these vehicles that an emergency vehicle was calling for the right of way. The intersection of each far field light spot and vehicle would depend on each vehicle's distance from the emergency vehicle and the distance between the lanes.

Embodiments described herein utilize light sources (such as light-emitting diodes (LEDs)), secondary optics, and control electronics to produce an array of light spots in the far field. The control electronics allow individual control of each light spot. Illuminating these spots in a predefined sequence allows for the creation of oscillating light patterns in the far field comparable to those produced by mechanical oscillating warning lights.

One advantage associated with these embodiments is that multiple oscillatory light patterns can be stored in memory and initiated as needed without the need for taking the warning device out of service. In this way, different oscillating patterns suitable for different circumstances can be available to the operator.

Figure 1:
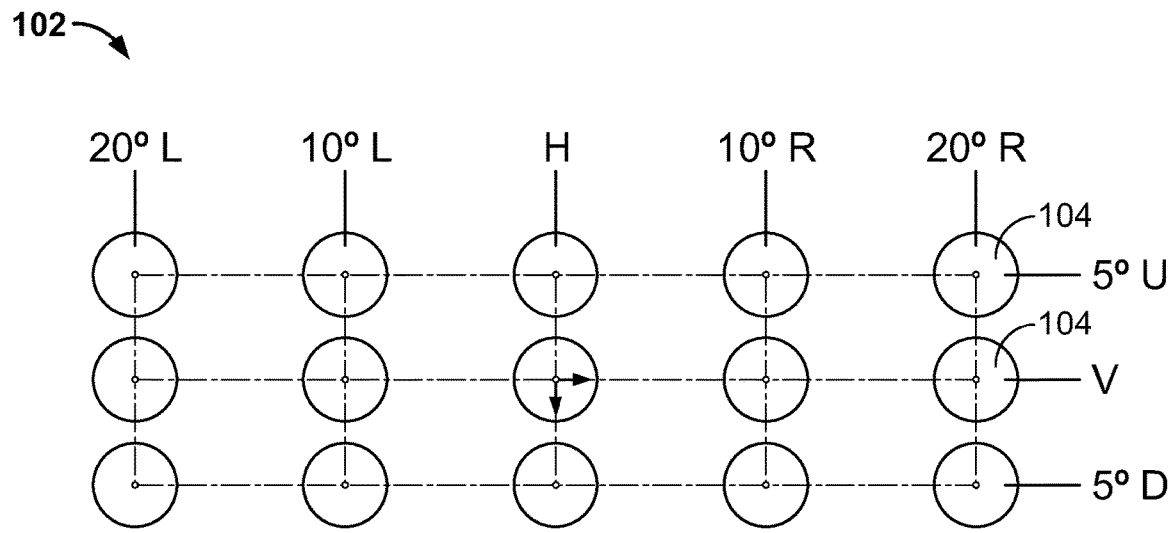
FIG. 1 is an example array of light spots in the far field.
Figure 2:
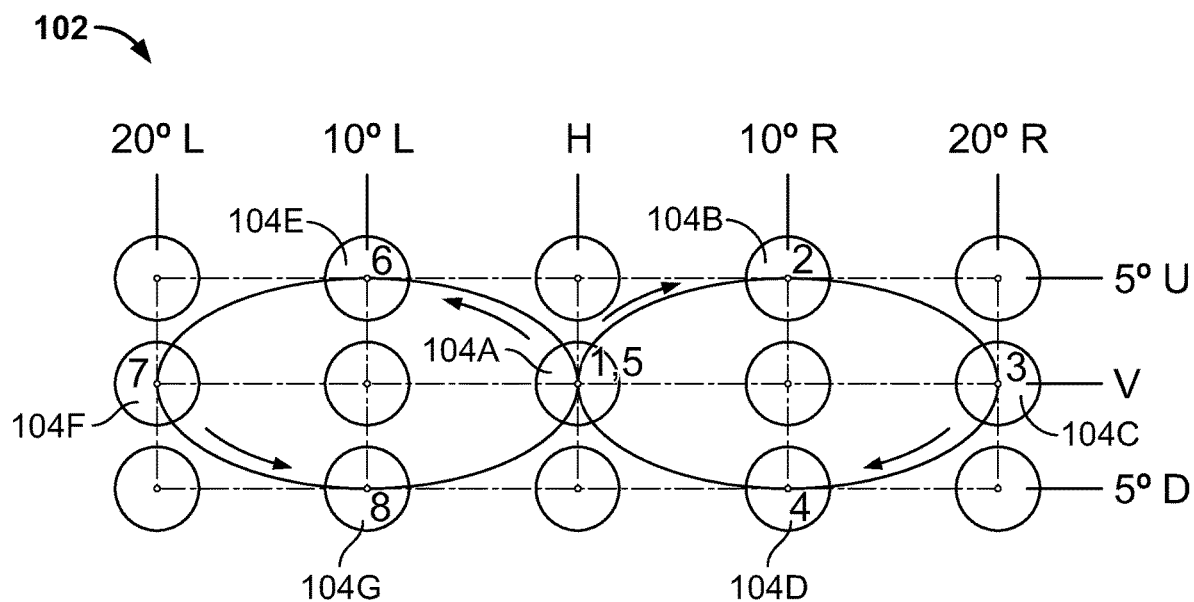
FIG. 2 is an example sequence of illumination of the array of light spots in FIG. 1 to create a figure "8" light pattern.
Figure 3:
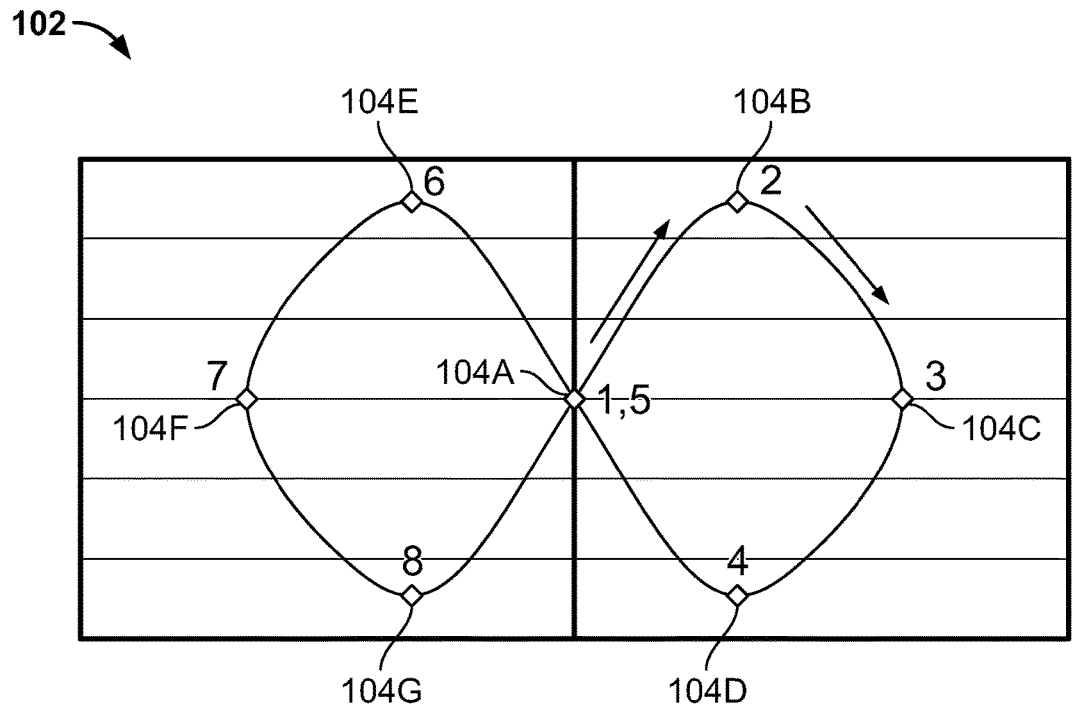
FIG. 3 is an example figure "8" light pattern as produced by the sequence of illumination of FIG. 2.

In one example, a plurality of light sources (such as Light-Emitting Diodes (LEDs)) and secondary optics are used to produce an array of light spots in the far field. In the embodiment described, an array 102 is composed of 15 spots or pixels 104, as depicted in FIG. 1. Each light spot 104 represents at least one light source, such as an LED.

The control electronics can individually control the state of each of these light spots 104, such as completely off, completely on, on with increasing intensity, on with decreasing intensity, etc. Sequencing, brightening, and dimming the state of each of these light spots 104 allows for the simulation of the far field lighting effect of an oscillating warning light.

FIGS. 2-5 illustrate some of the possible light patterns, such as a figure "8" pattern. For example, in FIGS. 2-3, a subset of 7 of the far-field spots 104A-104G are lit in the order indicated (e.g., 1, 2, 3, ... 8) to create a figure "8" pattern in the far field. This pattern can be repeated in the order indicated: 104A, 104B, 104C, 104D, 104A, 104E, 104F, and 104G.

Figure 4:
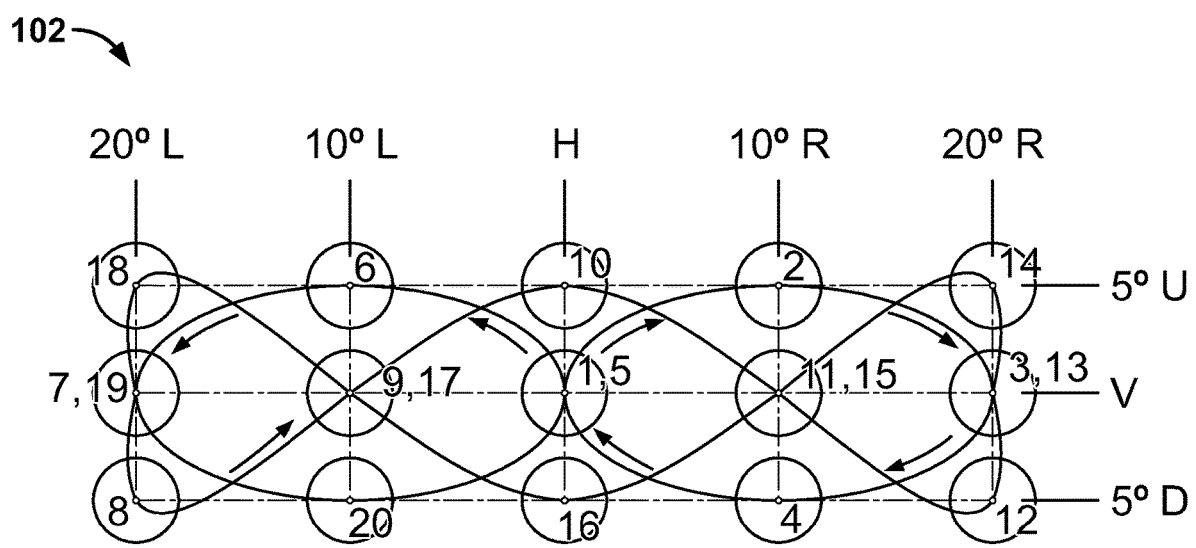
FIG. 4 is an example sequence of illumination of the array of light spots in FIG. 1 to create an oscillating light pattern.
Figure 5:
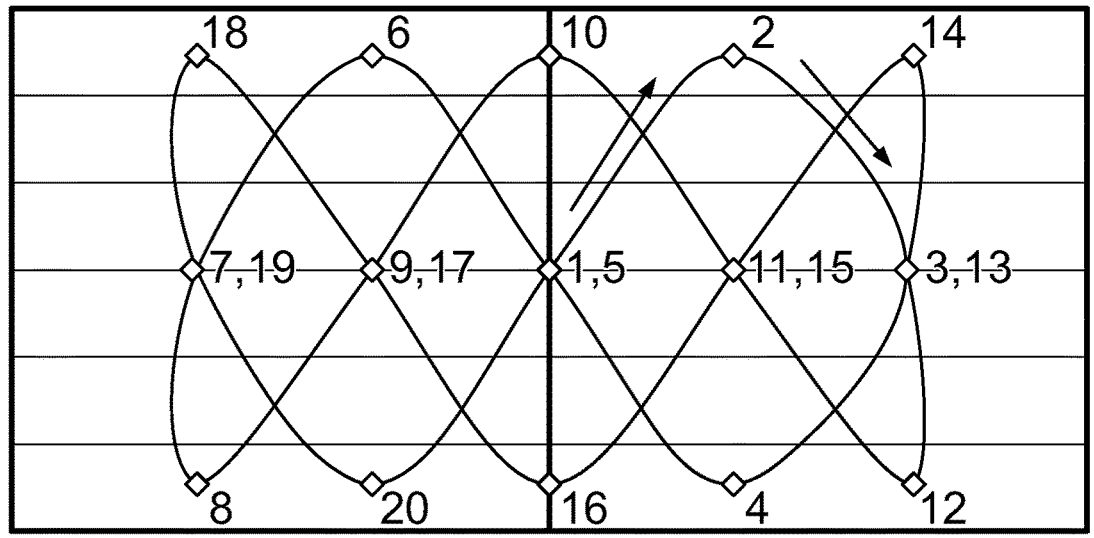
FIG. 5 is an example oscillating light pattern produced by the sequence of illumination of FIG. 4.

Likewise, in FIGS. 4-5, all 15 of the far-field spots 104 are lit in the noted order to create an oscillating pattern.

Figure 6:
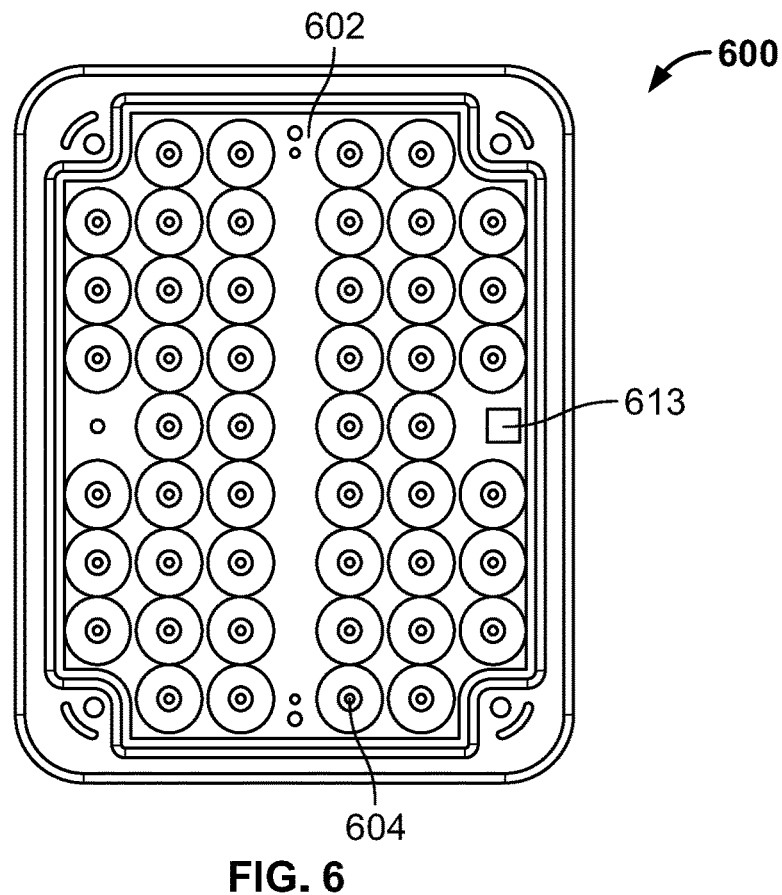
FIG. 6 is an example warning device including a rectangular array of light sources.
Figure 7:
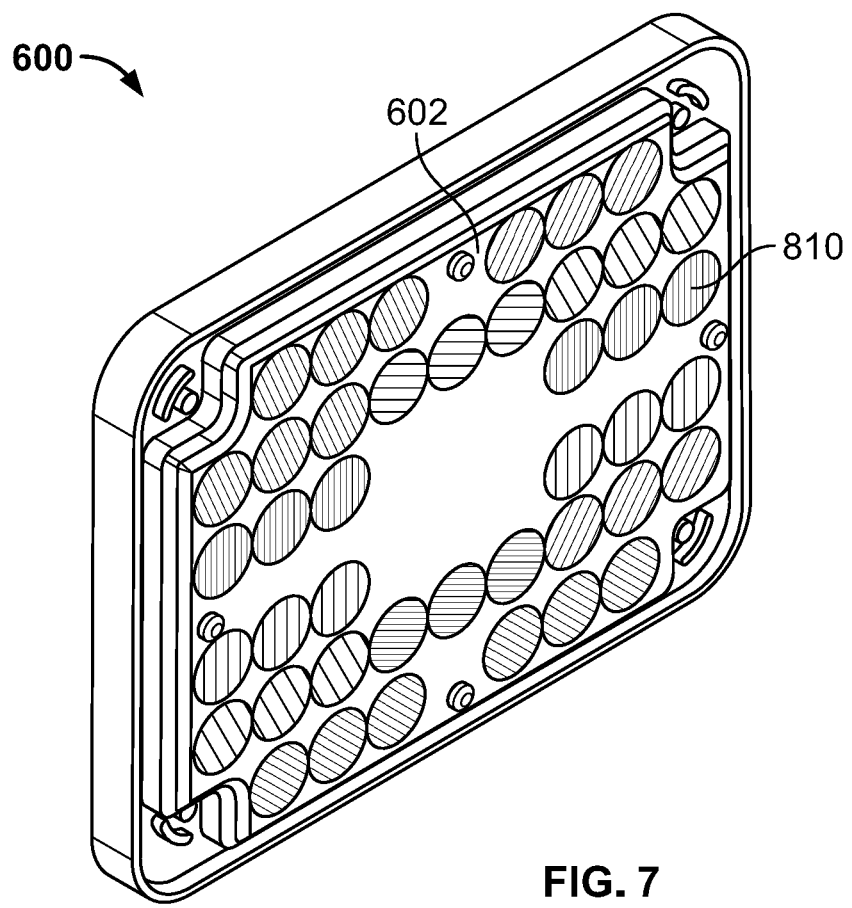
FIG. 7 is an isometric view of the rectangular array of FIG. 4 showing example prism orientations.
Figure 8:
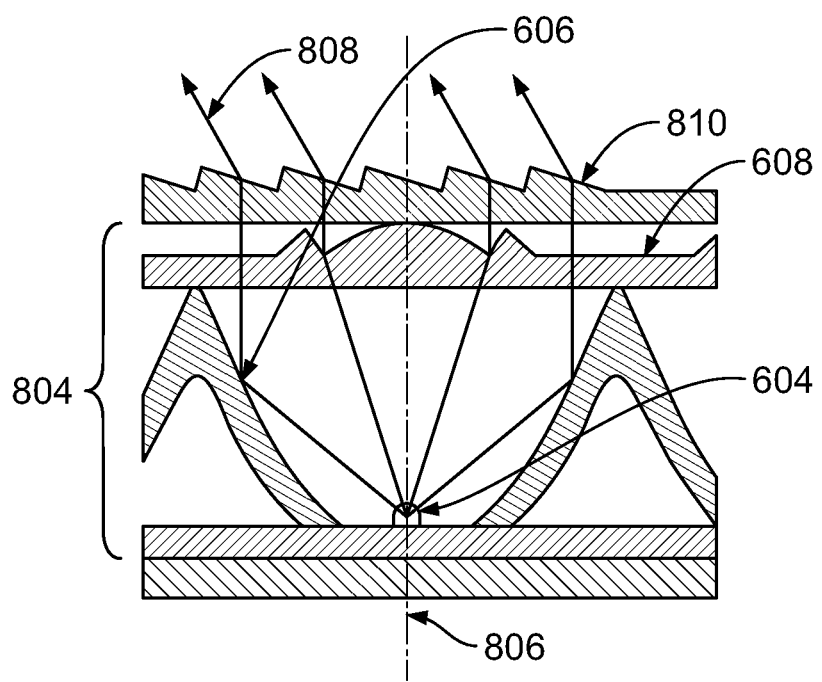
FIG. 8 is a cross section of an example cell of the rectangular array of FIG. 4.

As shown in FIGS. 6-8, a warning device 600 has an optical system 602 that is composed of a rectangular array of LEDs 604. Each LED 604 is surrounded by a reflector 606 and/or lens elements 608. The combination of the reflector 606 and/or lens elements 608 collimate the light from each LED 604 and direct it along the optical axis 806 of the LED 604. This results in effectively increasing the luminous intensity of each of the LED/Reflector/Lens (LRL) cells 804. Each LRL cell 804 then passes through an optical prism plate 810, which directs the light 808 to one of the 15 far field light spots. While the prism plate 810 is depicted as a separate component, its function could be incorporated into either the reflector element 606, lens element 608, or both. See, e.g., FIGS. 9 and 21, described below.

In this embodiment, the light output of three LRL cells 804 are directed to each of the 15 far field light spots. Alternatively, either more (4, 5, etc.) or less (1 or 2) LRL cells 804 could be directed to each of the 15 far field light spots. For example, in this embodiment, the H-V pixel (i.e., the middle six lights without associated prism elements) which is directly forward of the device has 6 LRL cells directed toward it. This is distinct from the embodiment shown in FIGS. 9 and 10, which only utilize as few as 1 LRL cell per far field light spot. The embodiment depicted in FIG. 12 uses 2 LRL cells per far field light spot. The number of LRL cells per far field light spot is dependent on the available physical space and the desired intensity of the far field light spot.

A controller 613 of the warning device 600 includes control electronics that are programmed to control illumination of each LED 604 to provide a desired effect (e.g., oscillations).

The preceding description is of one embodiment. Other embodiments are possible.

For example, as depicted in FIG. 9, the dimensions of the LED array could be changed so that the warning light 900 would be suitable for mounting in a warning light bar or installed into a housing to make a stand-alone warning device. In this example, the warning light 900 includes a printed circuit board 902 with LED sources 903 positioned thereon. In this example, the LED sources 903 are grouped into threes. An array of collimating optics 904 is provided, along with an outer lens 906. In this example, the outer lens 906 includes integral prism plate optics.

A warning light 1000 that includes splitting the single array into two arrays 1010, 1020 is depicted in FIG. 10. In this embodiment, 2 instances of the same device containing an 8×1 array of LRL cells can be used to produce the 15 element far-field light spot array 1100 previously described and shown in FIG. 11. The first device 1010 (the right hand device shown in FIG. 10) produces the 8 far-field light spots located at the center, left of center, and upper level of the far field pattern 1100. By inverting the second device 1020, it will produce the 8 far-field light spots located at the center, right of center, and lower level of the far field pattern 1100. Splitting the warning light 1000 in this way allows two of the same part to be used to produce the far field pattern, which is a manufacturing advantage. FIGS. 10-11 depict how the LRL cells in each device 1010, 1020 are mapped into the far field 15 light spot array 1100.

Figure 12:
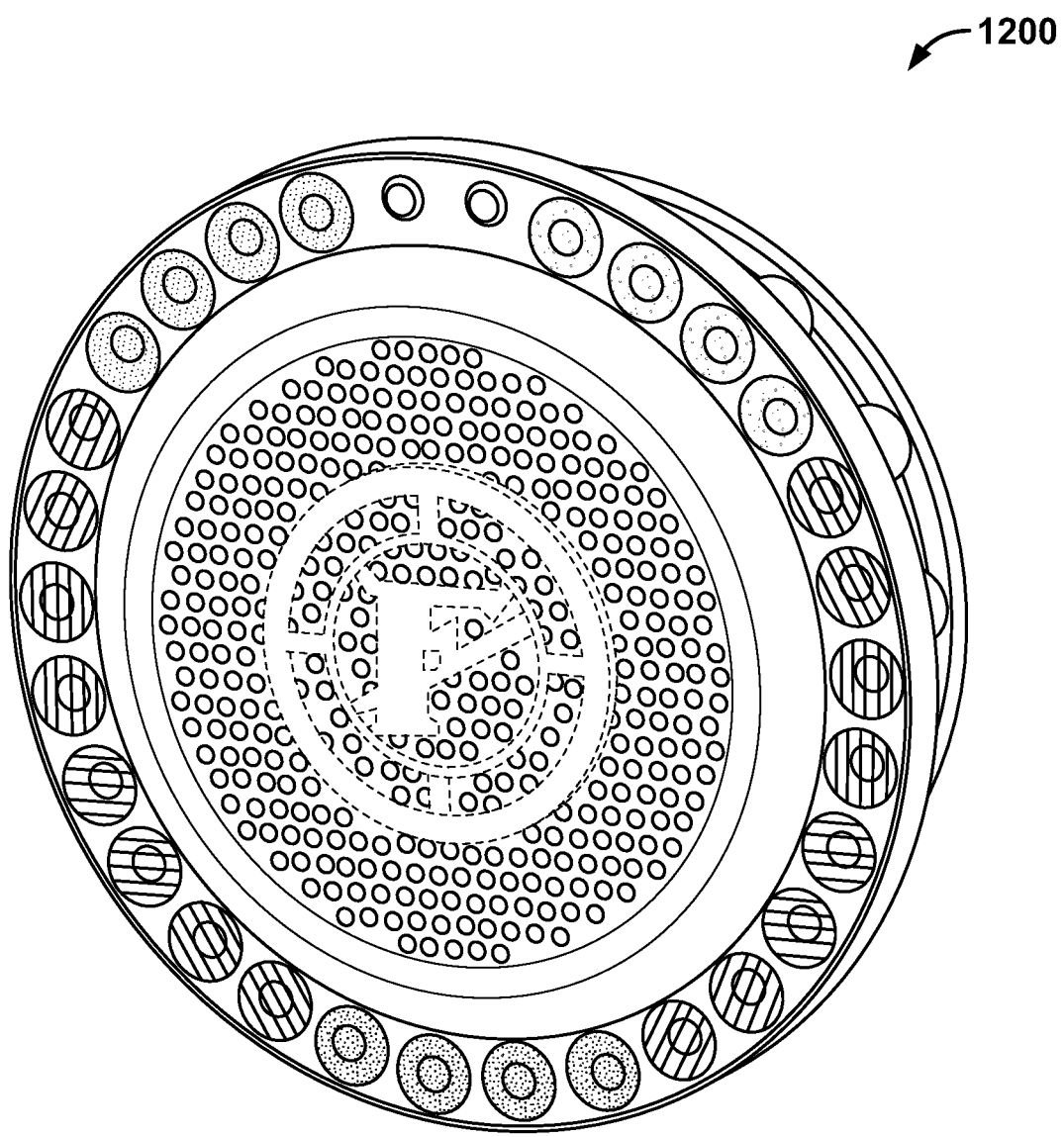
FIG. 12 is another example warning device including a circular array of light sources.
Figure 13:
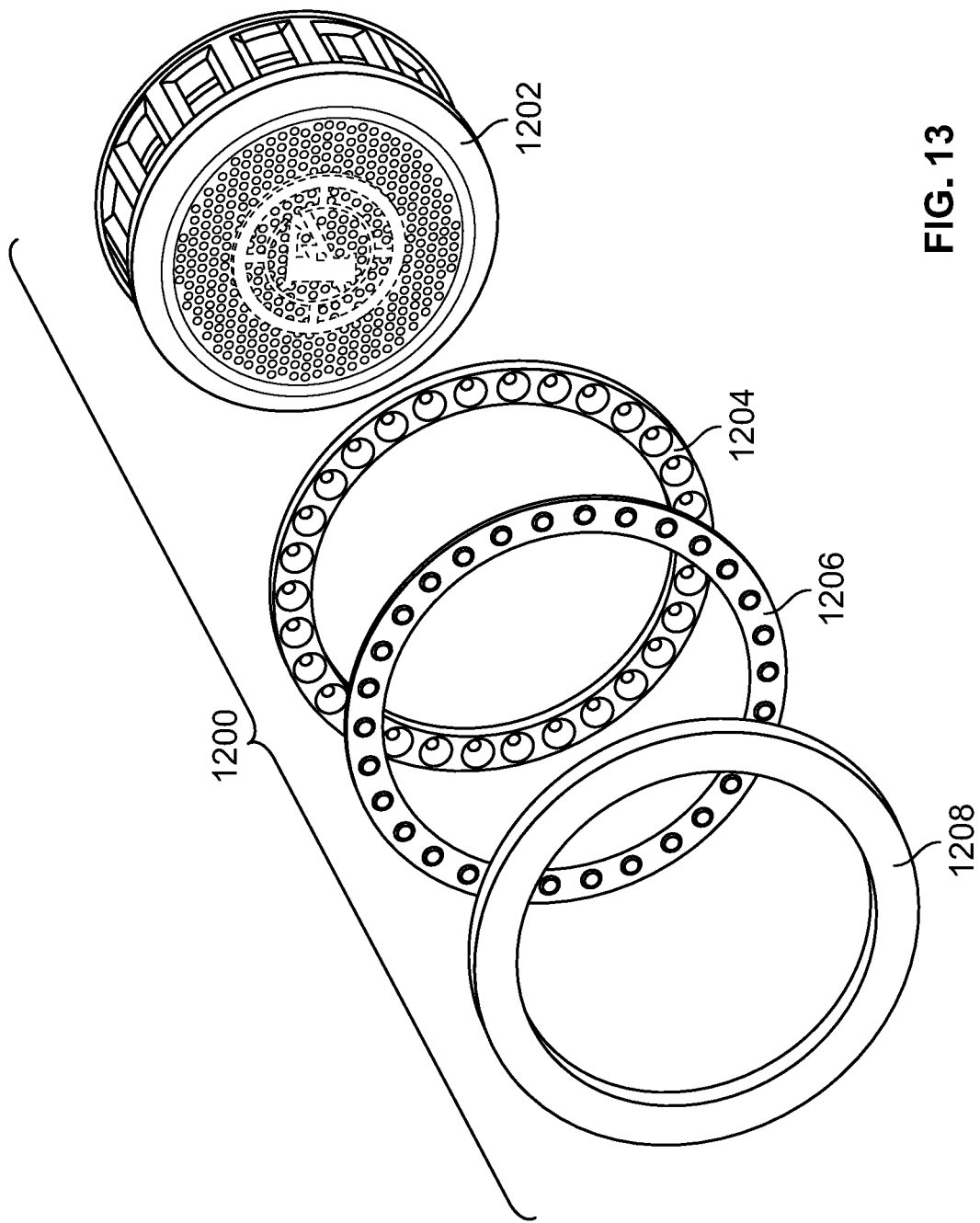
FIG. 13 is an exploded view of the warning device of FIG. 12.
Figure 14:
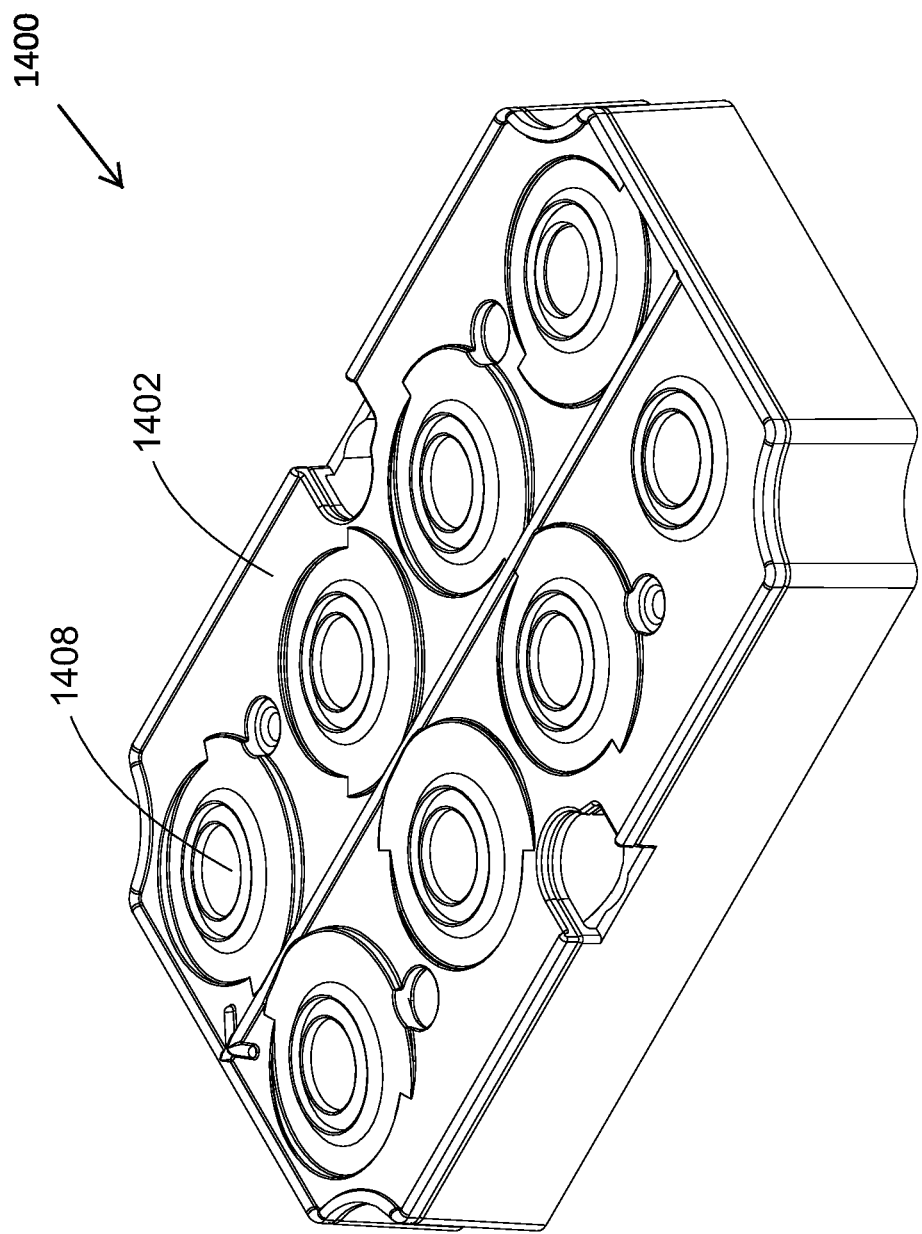
FIG. 14 is another example warning device with a principal axis of the reflector and lens system being tilted.
Figure 15:
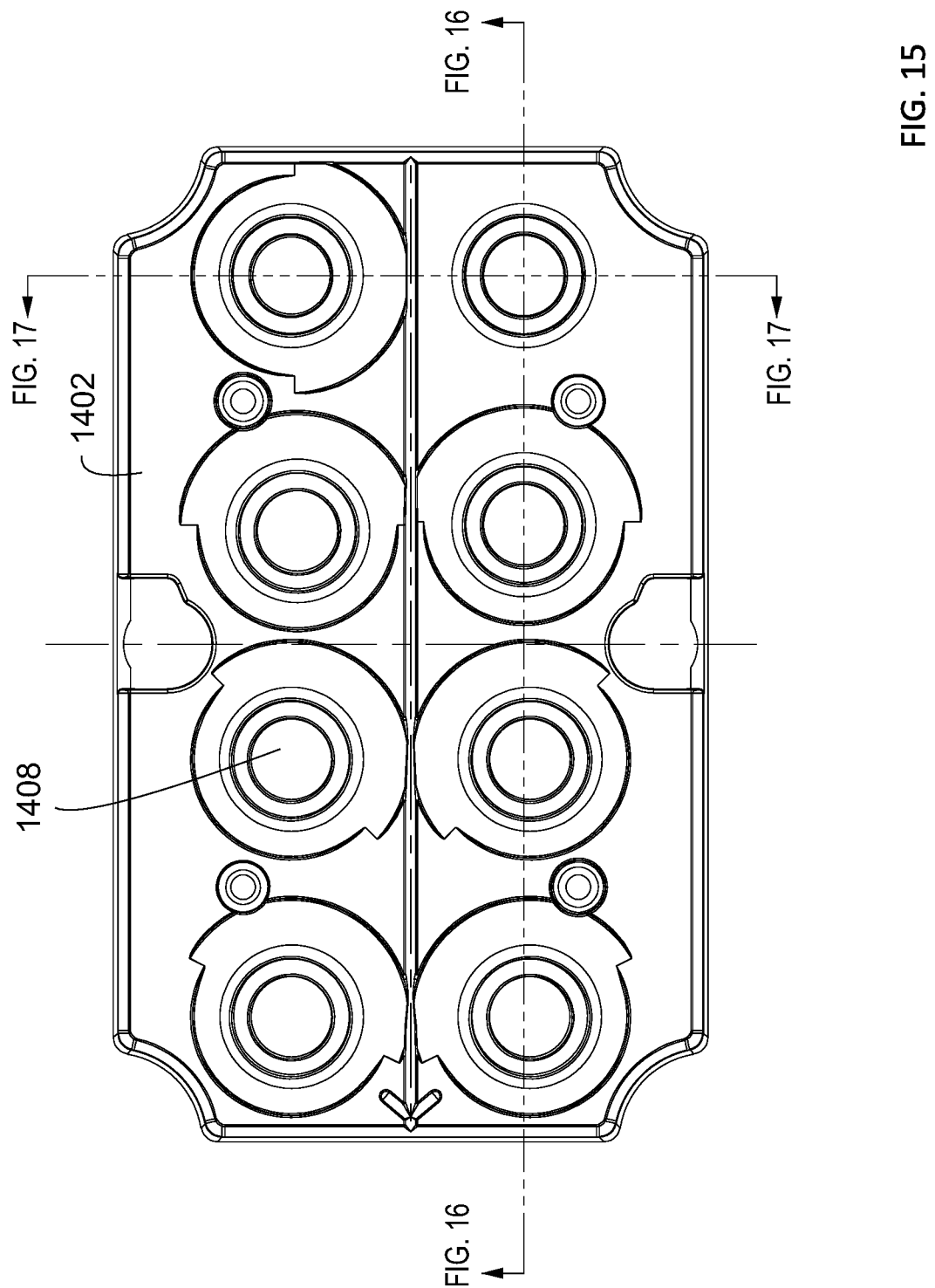
FIG. 15 is a top view of the warning device of FIG. 14.

Another variation of a warning device 1200 is depicted in FIGS. 12-13. In this embodiment, the LRL cells include a reflector ring 1204 and are positioned in a circular array instead of rectangular array. When configured in a circular array, the reflector ring 1204 can surround a siren 1202 (such as the Federal Signal Q-Siren) that emits an emergency sound or other type of warning device resulting in a multifunction device. In the example depicted, the reflector ring 1204 is configured with LEDs positioned about the circular array, and a lens ring 1206 and a prism plate ring 1208 are positioned to form the warning device 1200 shown in FIG. 12.

Figure 16:
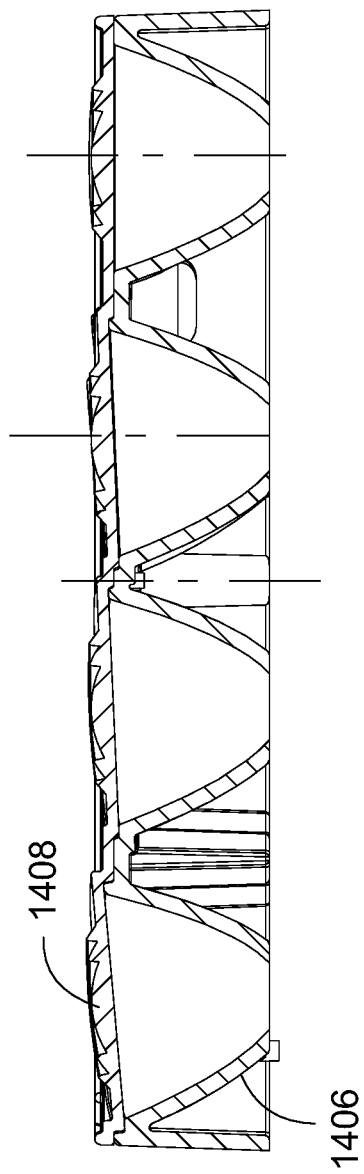
FIG. 16 is a cross section of example cells of the warning device of FIG. 14.
Figure 17:
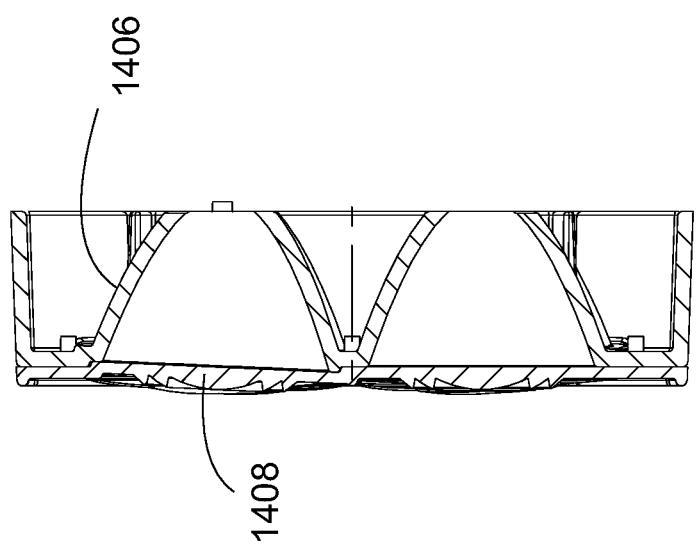
FIG. 17 is another cross section of example cells of the warning device of FIG. 14.
Figure 18:
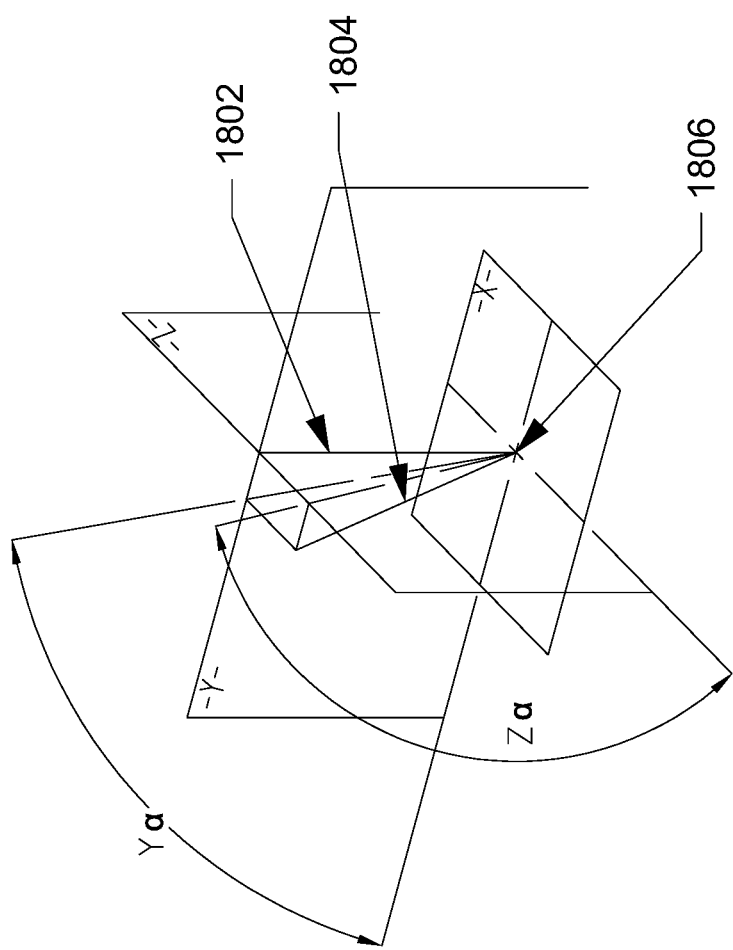
FIG. 18 is a schematic view of the principal axes of the light source and the lens of the cells of the warning device of FIG. 14.

Referring now to FIGS. 14-18 and 23, another variation of a warning device 1400 having an optical system 1402 is depicted. In this example, the principal axis 1804 of the reflector 1406 and lens 1408 system (the lens 1408 is transparent let light pass therethrough) is tilted at a prescribed angle α, as depicted in FIGS. 16 and 18. This results in light emanating from the device 1400 being collimated at the angle α along the tilted principal axis 1804 in both the Y and Z planes. See FIG. 18. The tilting of the reflector 1406 and lens 1408 system provides the direction of the light from the focal point 1806 of the associated light source to one of the far field light spots without requiring a prism plate. The principal axis 1804 of the reflector 1406 and the lens 1408 system is thus tilted at a nonzero angle relative to the optical axis 1802 of the associated light source.

Figure 23:
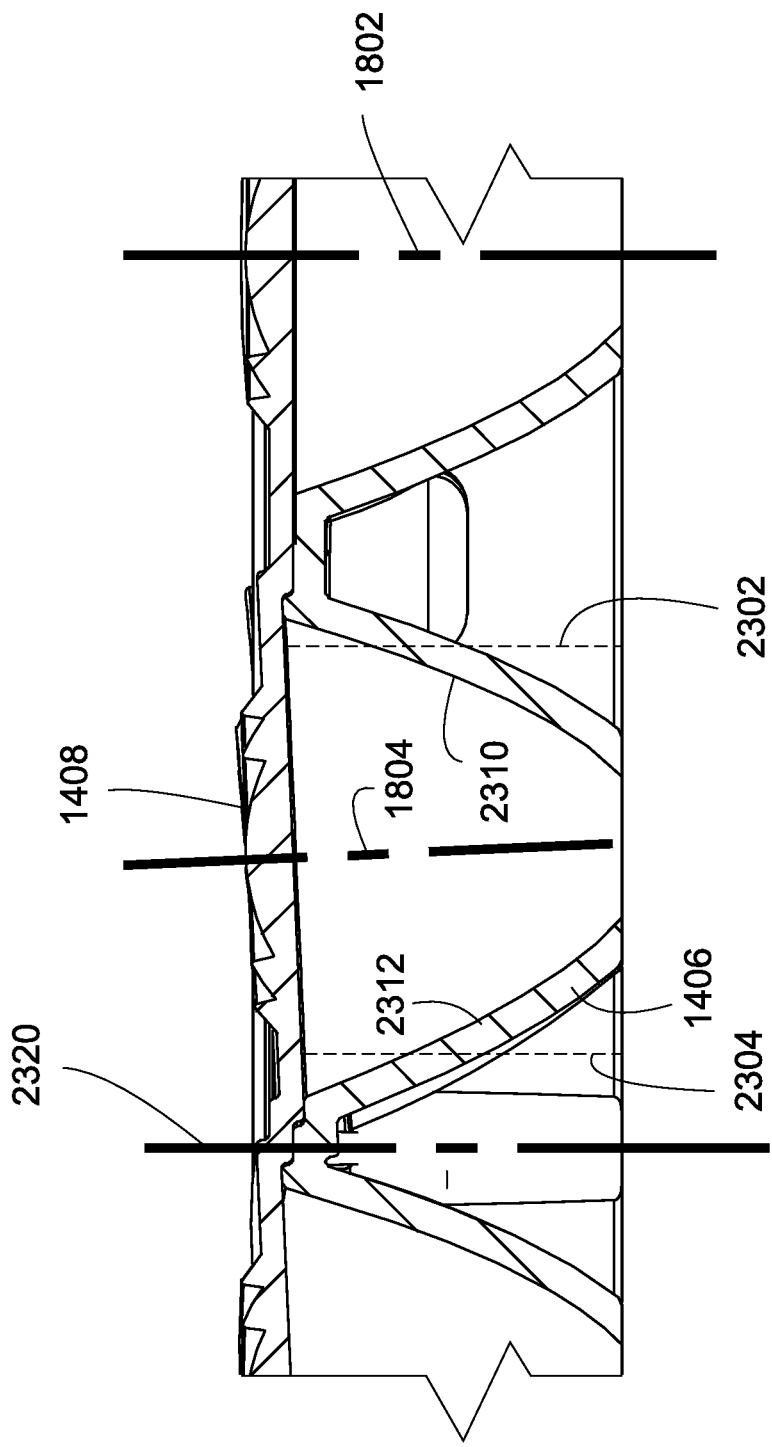
FIG. 23 is an enlarged view of the cross section of the warning device of FIG. 14.

As shown in FIG. 23, the lens 1408 is positioned outside of the reflector 1406. A first portion 2310 of the reflector 1406 extends at a first distance 2302, and a second portion 2312 of the reflector extends at a second distance 2304. The reflector 1406 and the lens 1408 system is tilted relative to the optical axis 1802 of the associated light source, such that the first distance 2302 is greater than the second distance 2304. A portion 2320 of the lens 1408 steps upward for the next reflector 1406 to accommodate the tilt and the different distances 2310 and 2312 such that each of the lenses 1408 is angled to direct light to one of the far field light spots.

Figure 19:
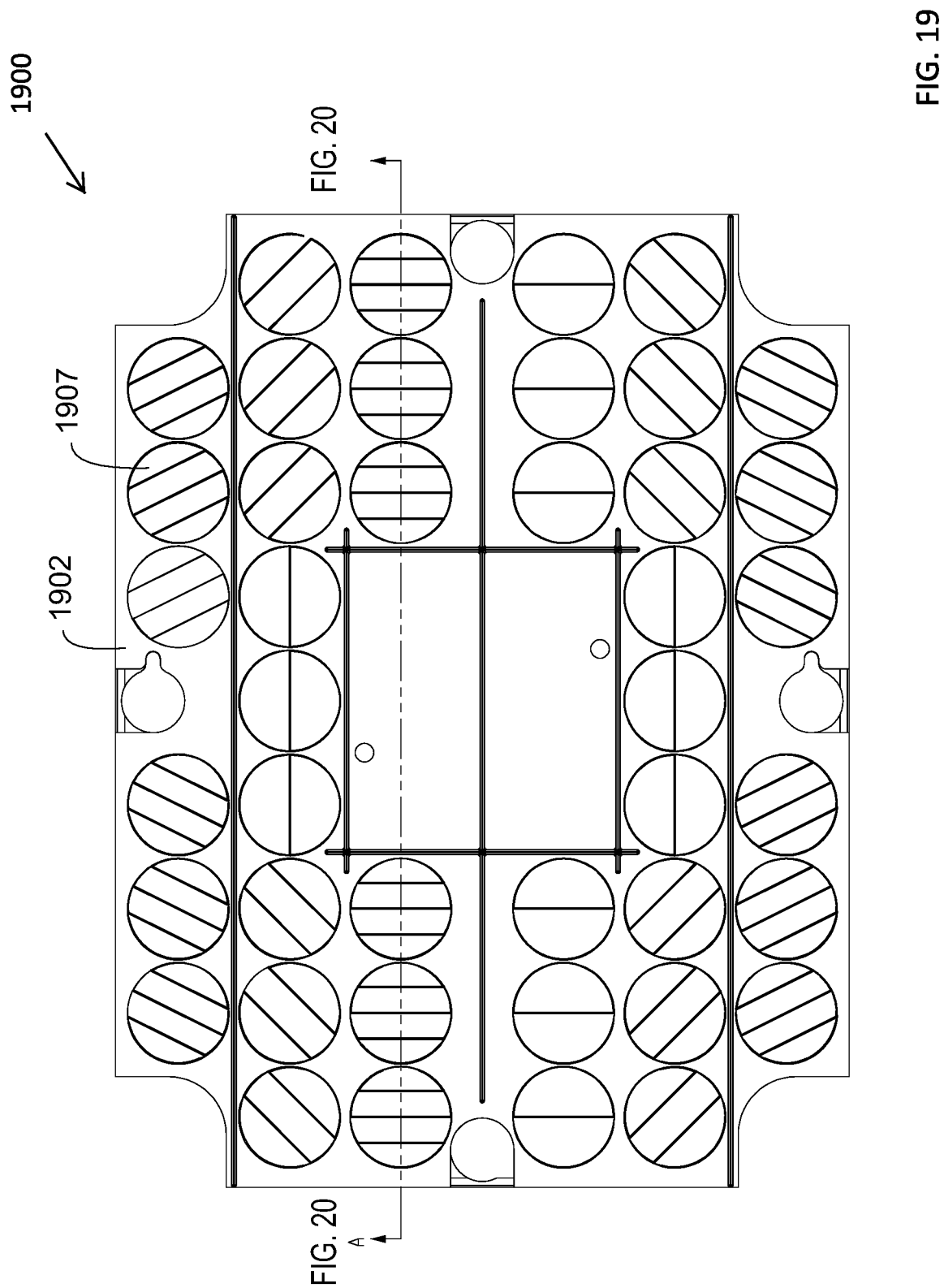
FIG. 19 is another example warning device with the lens and prism plates being combined into a single, integral body.
Figure 20:
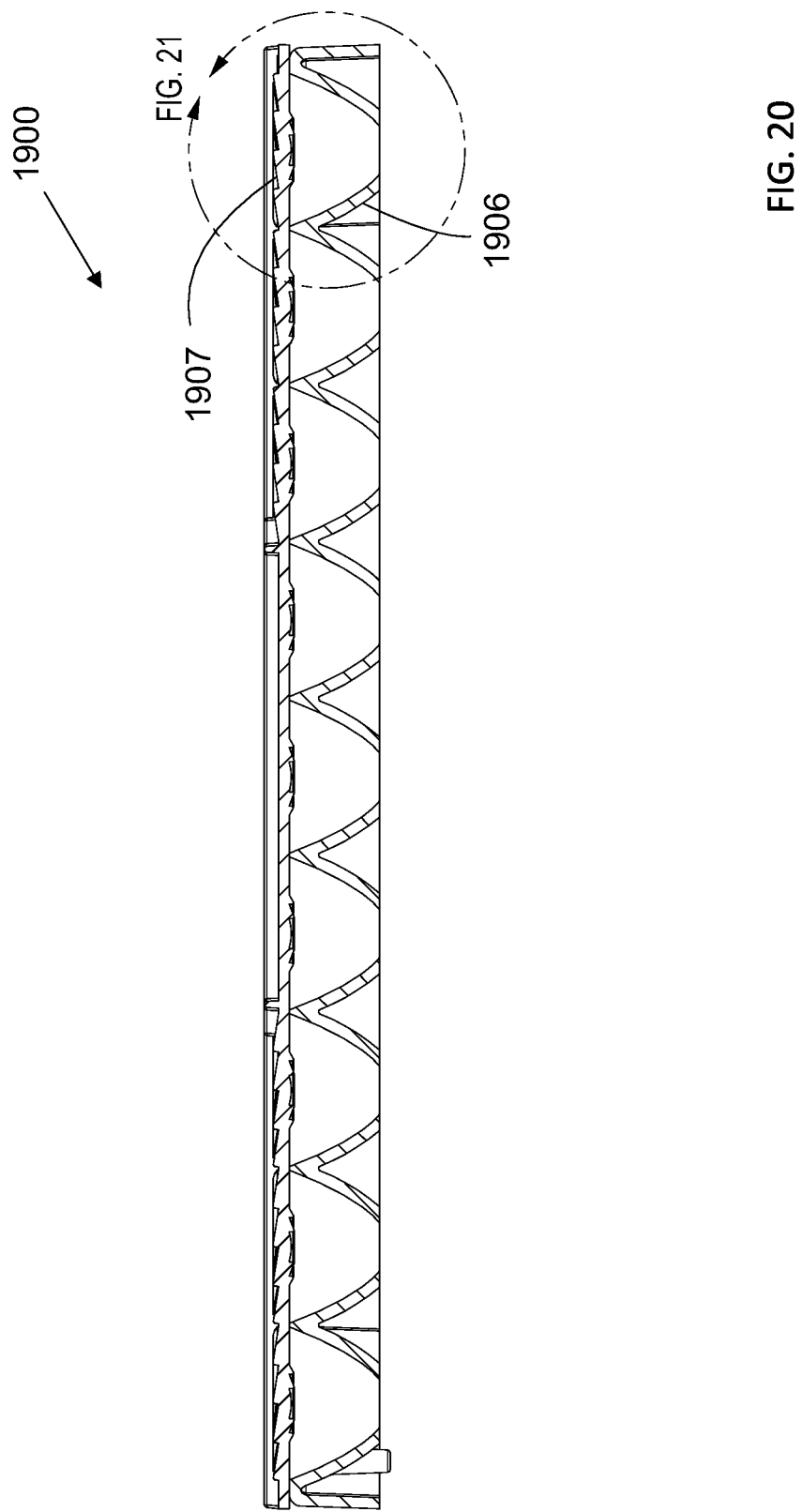
FIG. 20 is a cross section of example cells of the warning device of FIG. 19.
Figure 21:
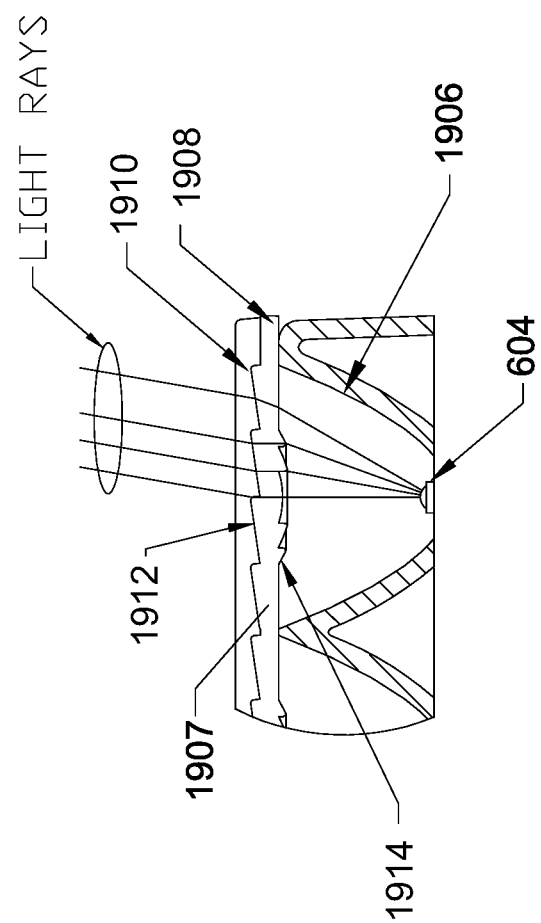
FIG. 21 is an enlarged view of one of the cells of the example cells of FIG. 20.

Referring now to FIGS. 19-21, another variation of a warning device 1900 having an optical system 1902 is depicted. In this example, the lens features 1908 and prism plate features 1910 are combined into a single, integral body 1907 (similar to that of the outer lens 906 with the integral prism plate optics of FIG. 9). The combined lens and prism plate 1907 (which is transparent to let light pass therethrough) functions to both collimate the light and focus the light in far field light spots. In this example, the lens features 1908 are formed on an interior surface 1914 of the combined lens and prism plate 1907, and the prism plate features 1910 are formed on an outer surface 1912 of the combined integral body 1907 of lens and prism plate.

Figure 22:
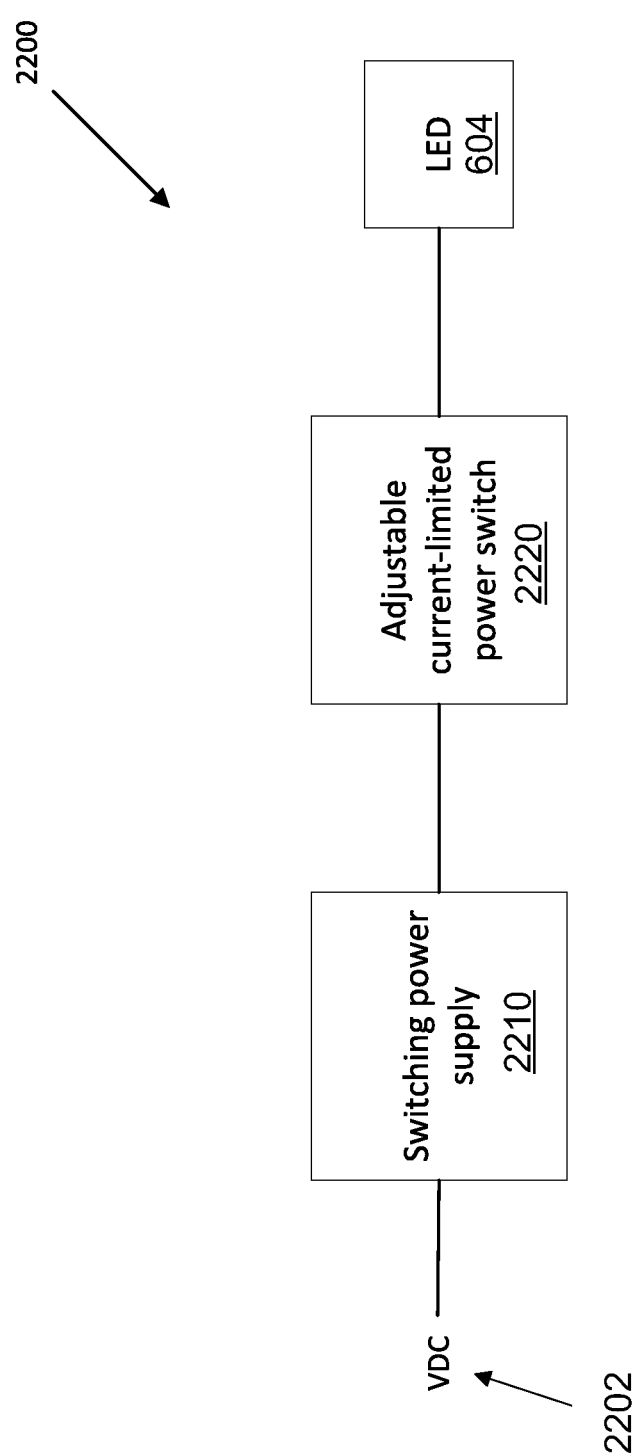
FIG. 22 is an example drive system for a warning device.

Referring now to FIG. 22, an example drive system 2200 for a warning device is shown. In this example, the drive system 2200 is a two-stage system.

The solid-state physics of high brightness LEDs 604 result in a forward voltage drop that varies slightly based on the solid-state chemistry of the particular device. The Forward Voltage (VF) is a device parameter that is controlled in binning of LEDs by the LED manufacturer and is specifiable when ordering a particular LED device. In designing High Brightness LED circuits, it can be important not to overdrive an LED Emitter. Regulating the voltage applied to the device and limiting the current going through the device optimizes optical and thermal performance of the device.

The drive system 2200 uses a switching power supply 2210 to step down the DC input voltage 2202. The output voltage of the switcher 2210 is chosen to be a voltage of a certain amount (e.g., 0.2 VDC) above the maximum VF of the LED 604 being driven. The LEDs 604 in the drive system 2200 are not being driven in strings of three LED's as in typical applications. An individual LED 604 is being driven in the drive system 2200. The output voltage of the switcher 2210 is set to a precise output through choosing precision resistors to minimize prematurely destroying or thermally degrading the device.

The voltage of the switcher 2210 is connected to an adjustable current-limited power switch 2220. In one example, the chosen adjustable current-limited power switch 2220 is a Texas Instruments TPS2561A-Q1 Dual Channel Precision Automotive Adjustable Current-Limited Power Switch. This device is intended for automotive applications where precision current limiting is required. Typical LED driver schemes measure the current going through a string of LEDs and, through feedback, regulate the current. These switches are designed to be very precise by using a 0.1 percent resistor and limit the current going to a load. A sharp current limit is set through the power switch 2220, allowing for a maximum current flow through the device.

Figure 24A:
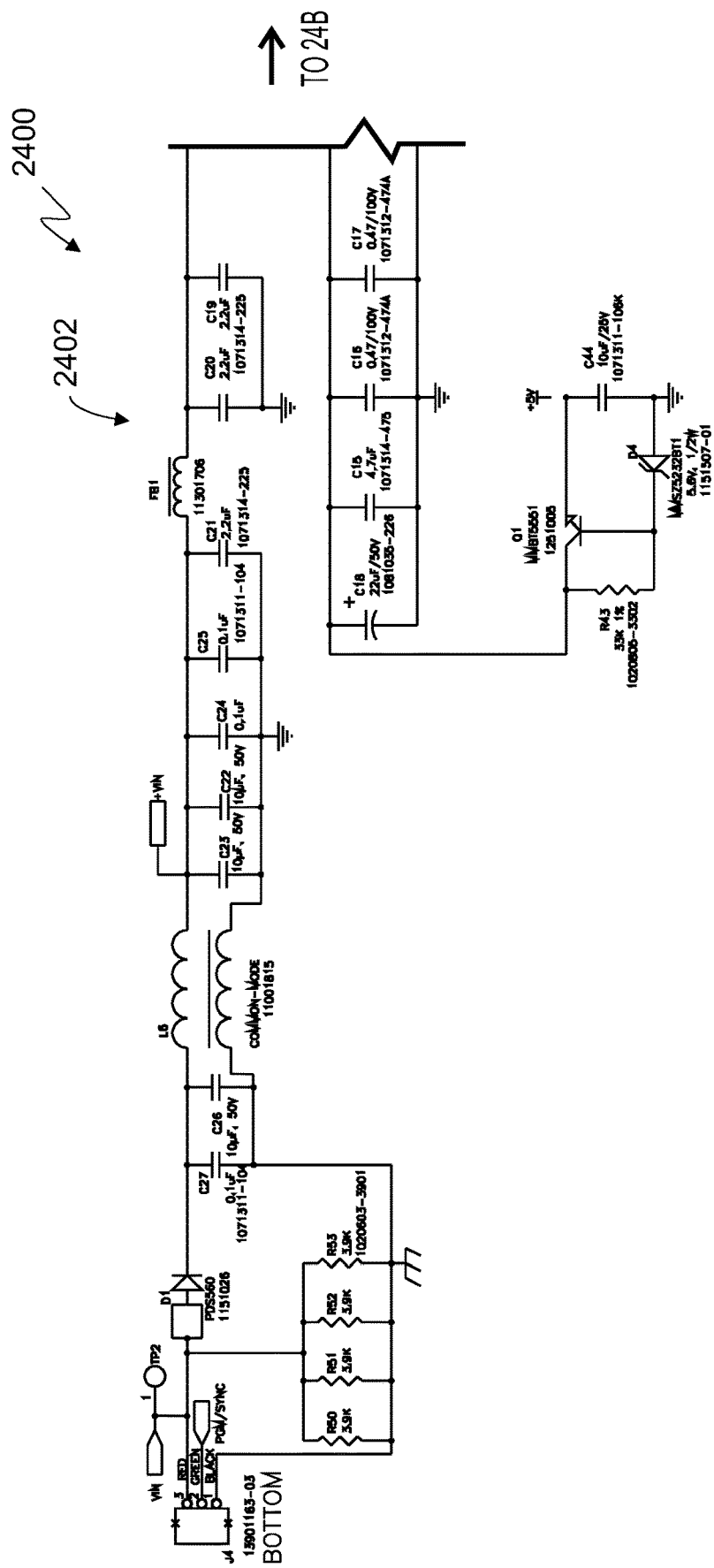
FIG. 24A is a schematic diagram of a portion of example circuitry that can be used for the drive system of FIG. 22.
Figure 24B:
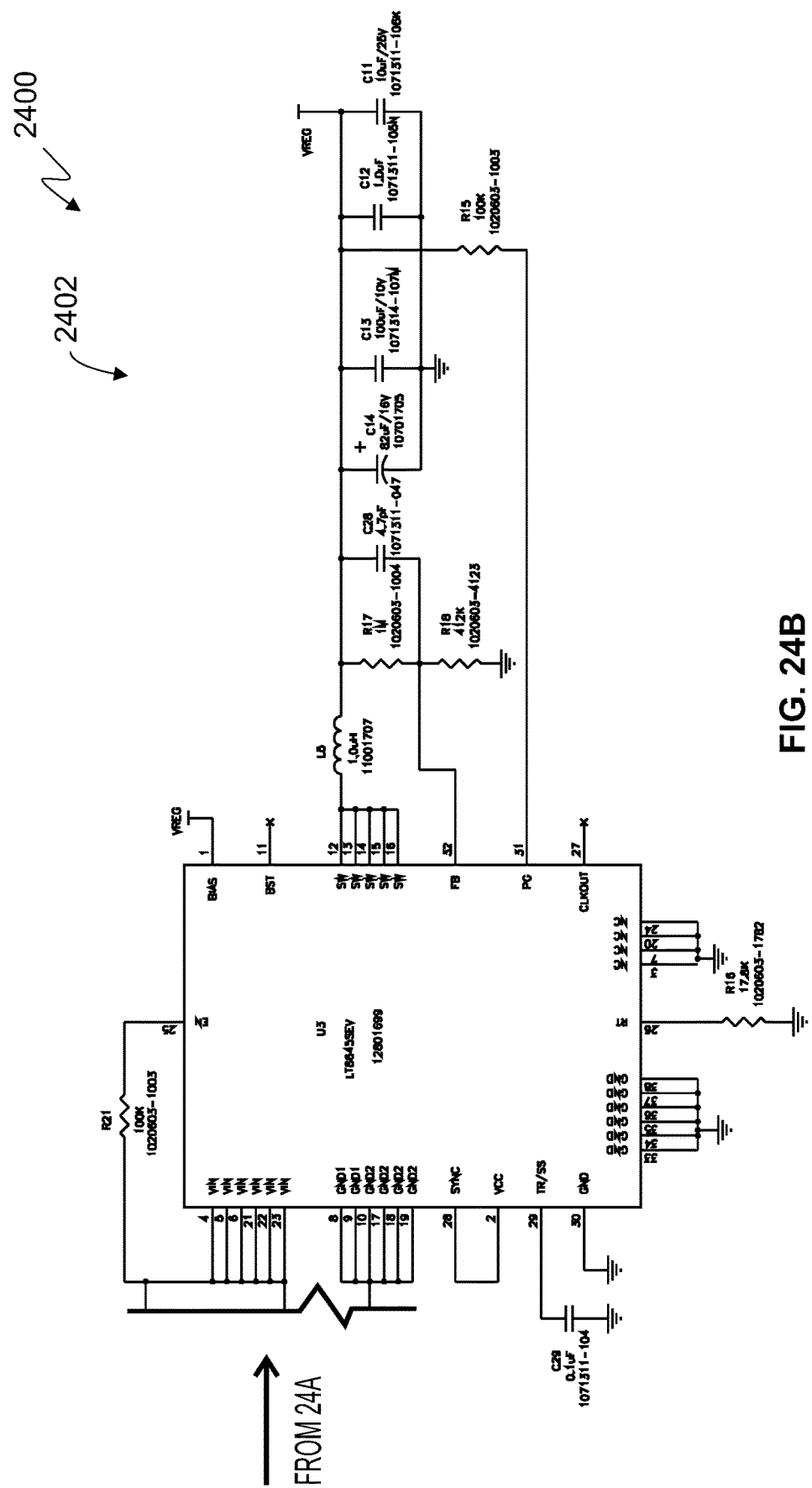
FIG. 24B is a schematic diagram of a further portion of example circuitry that can be used for the drive system of FIG. 22.
Figure 24D:
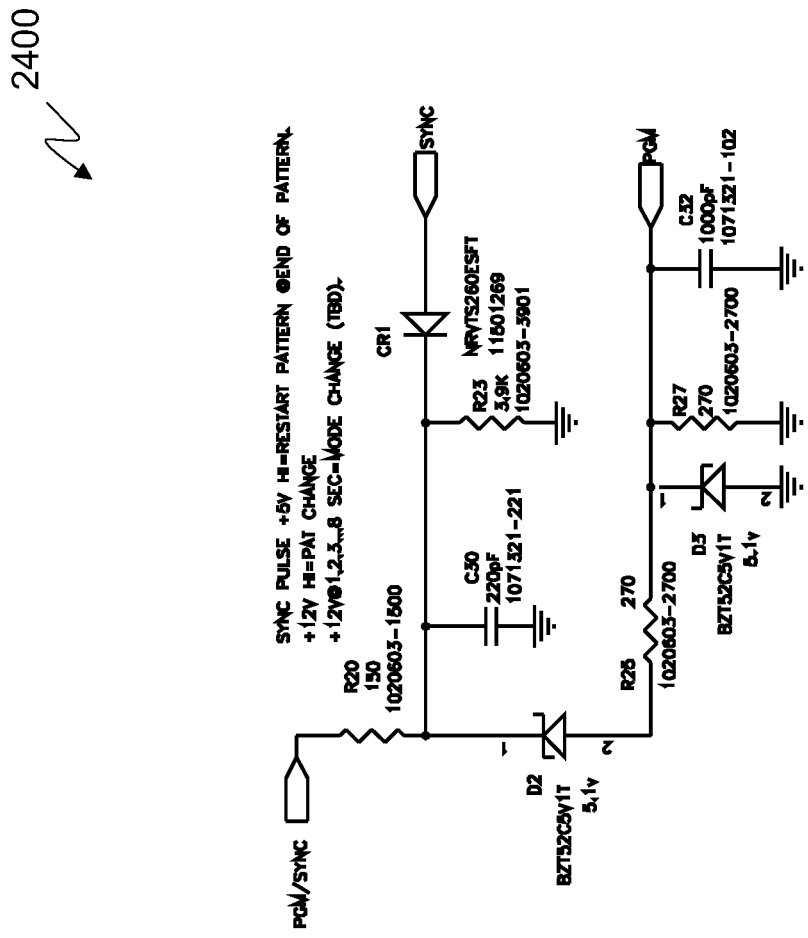
FIG. 24D is a schematic diagram of a further portion of example circuitry that can be used for the drive system of FIG. 22.
Figure 24C:
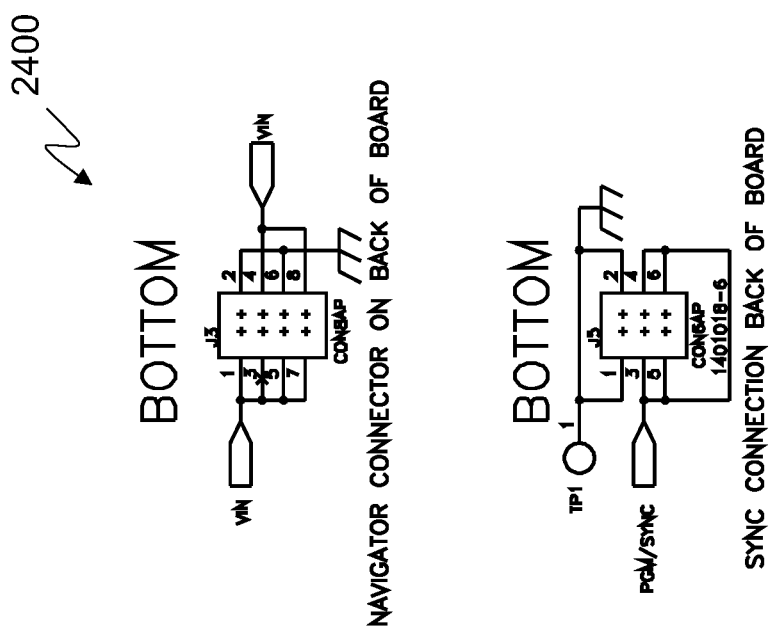
FIG. 24C is a schematic diagram of a further portion of example circuitry that can be used for the drive system of FIG. 22.
Figure 24F:
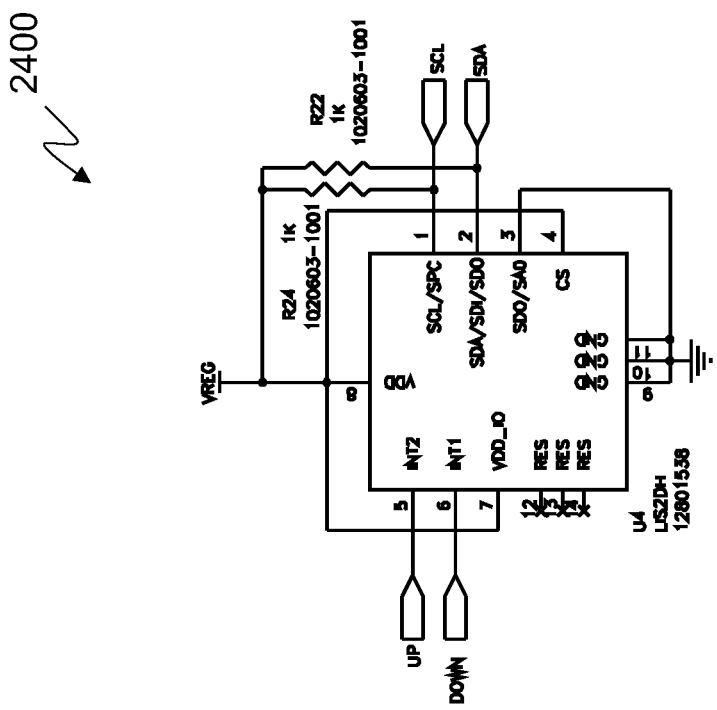
FIG. 24F is a schematic diagram of a further portion of example circuitry that can be used for the drive system of FIG. 22.
Figure 24E:
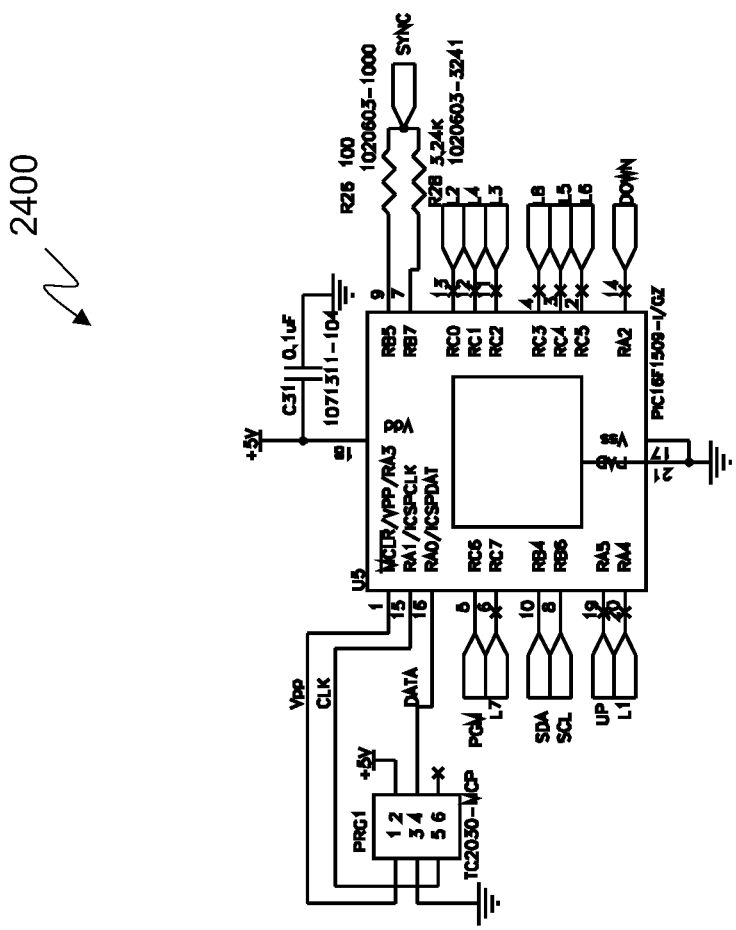
FIG. 24E is a schematic diagram of a further portion of example circuitry that can be used for the drive system of FIG. 22.
Figure 24G:
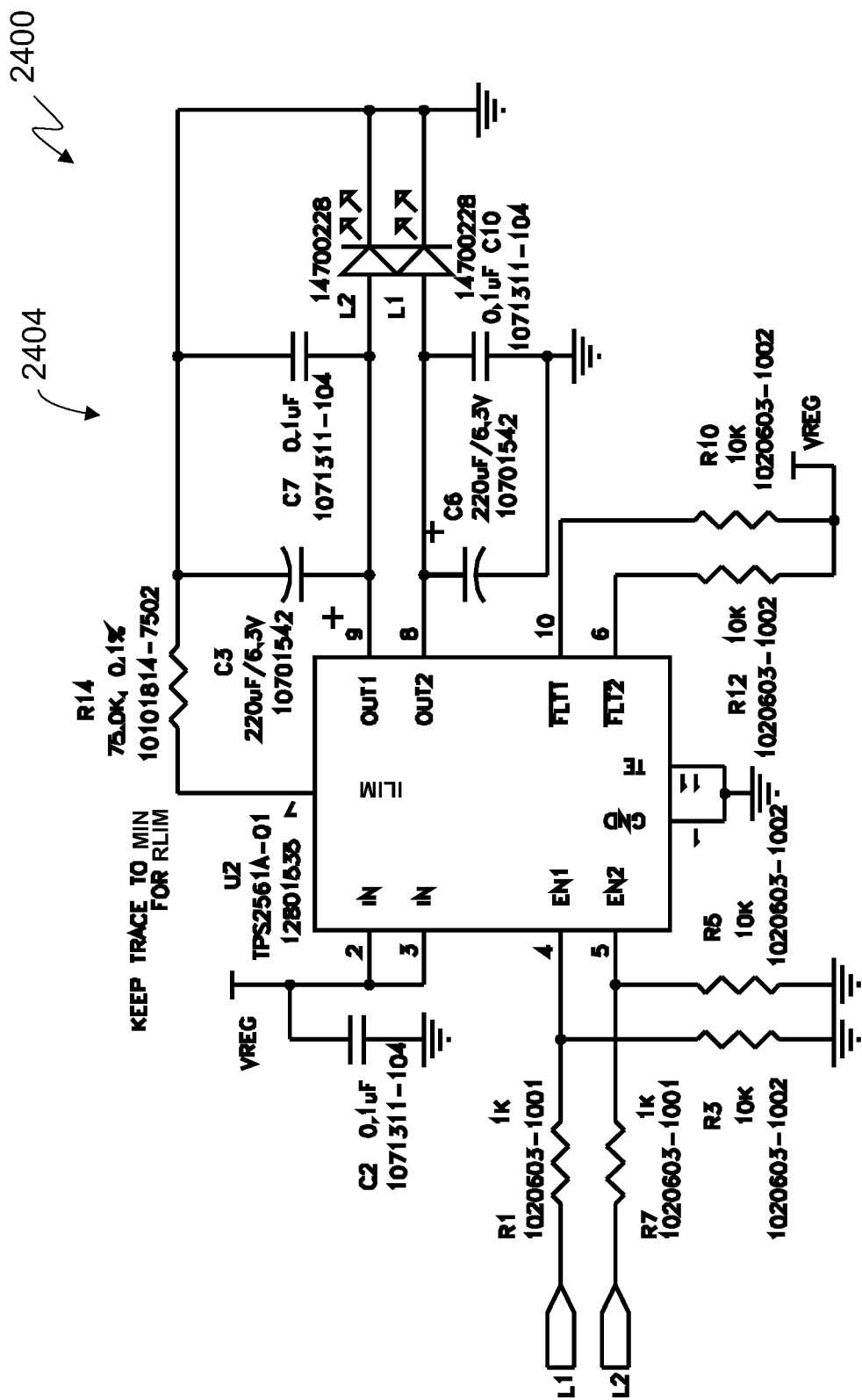
FIG. 24G is a schematic diagram of a further portion of example circuitry that can be used for the drive system of FIG. 22.
Figure 24H:
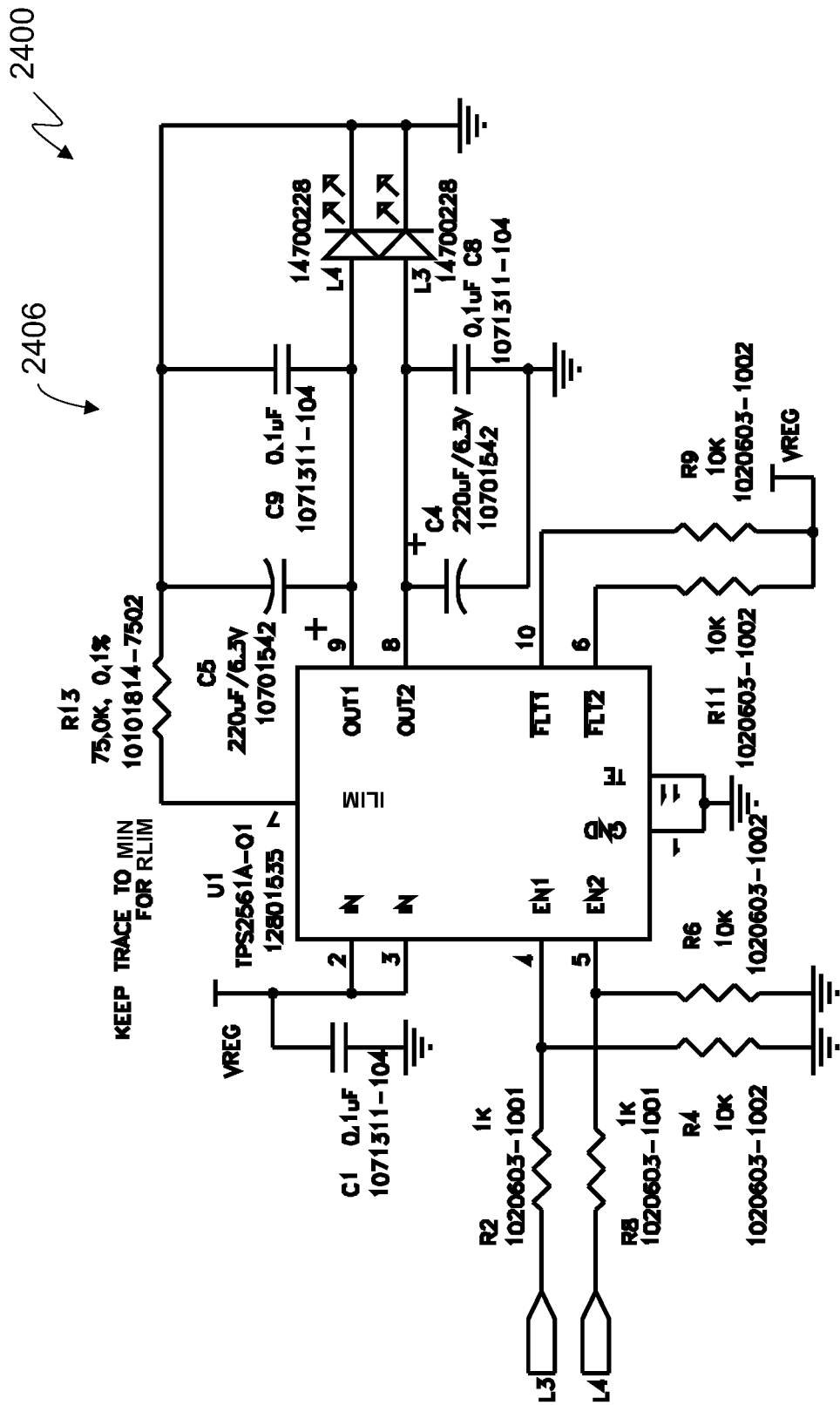
FIG. 24H is a schematic diagram of a further portion of example circuitry that can be used for the drive system of FIG. 22.
Figure 24I:
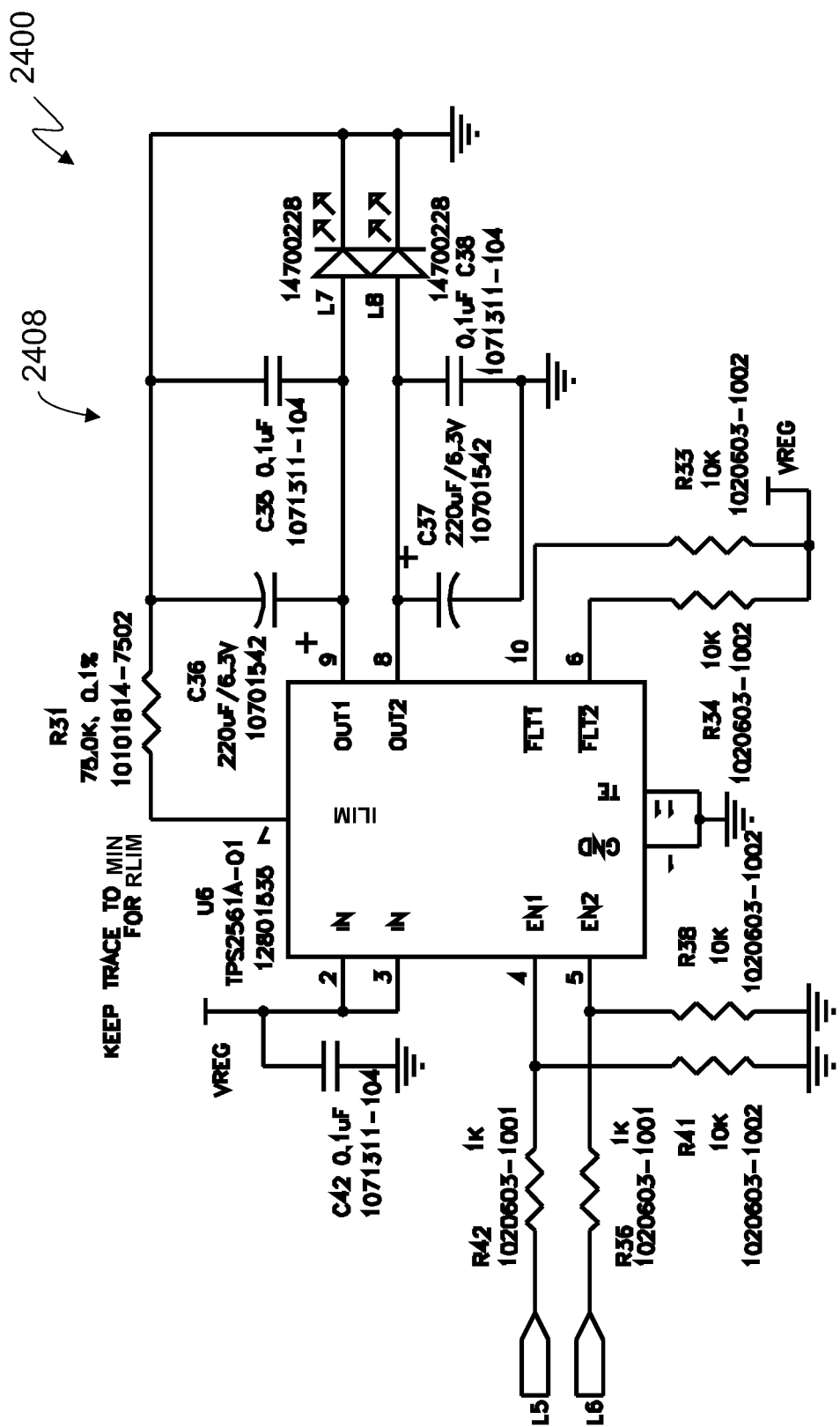
FIG. 24I is a schematic diagram of a further portion of example circuitry that can be used for the drive system of FIG. 22.
Figure 24J:
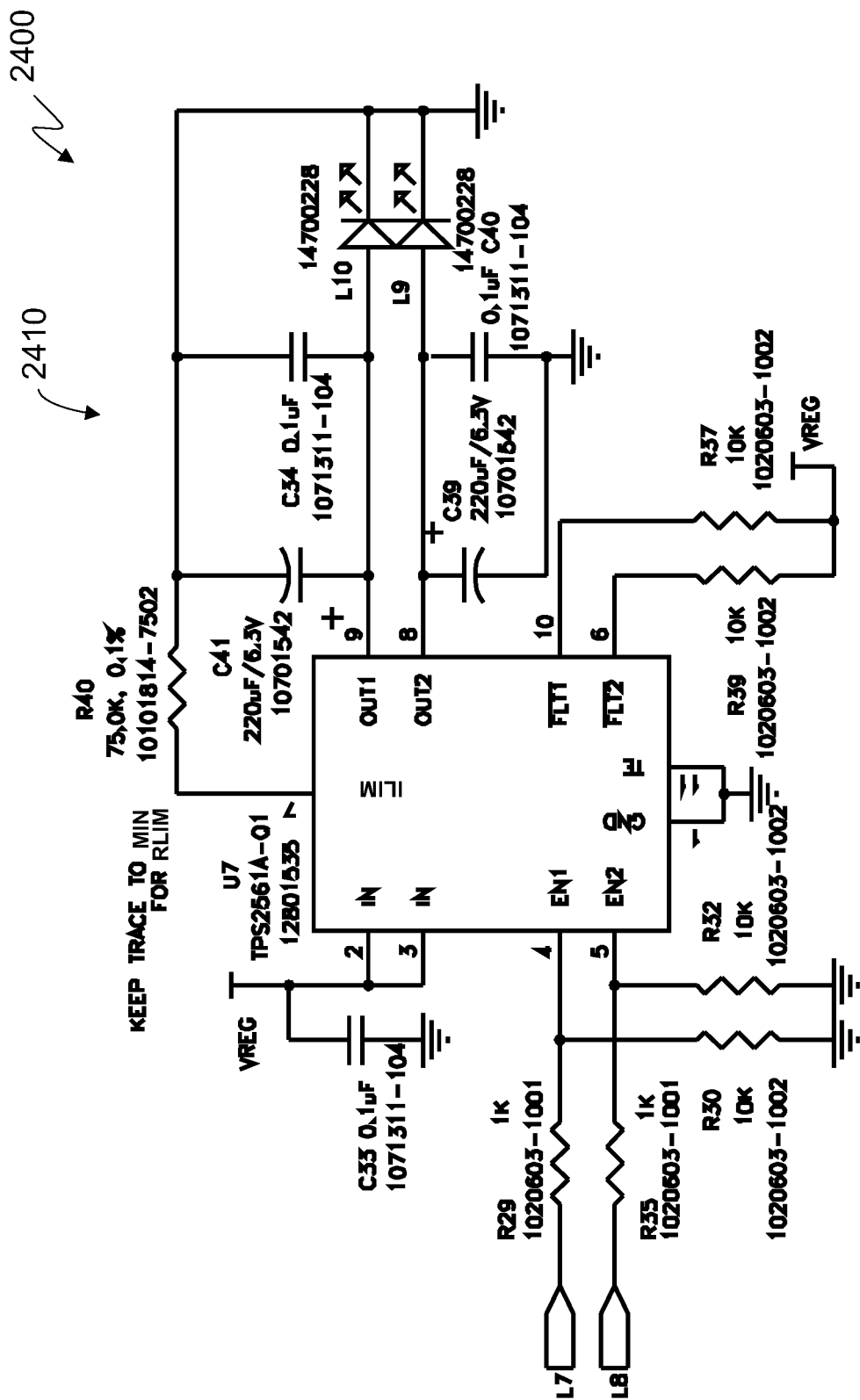
FIG. 24J is a schematic diagram of a further portion of example circuitry that can be used for the drive system of FIG. 22.
Figure 24K:
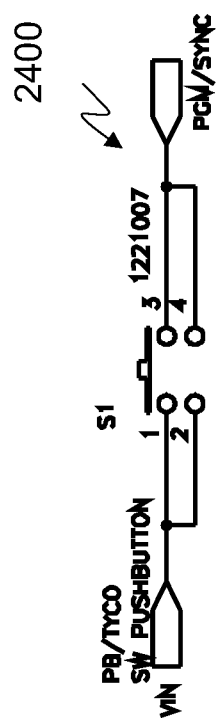
FIG. 24K is a schematic diagram of a further portion of example circuitry that can be used for the drive system of FIG. 22.
Figure 24M:
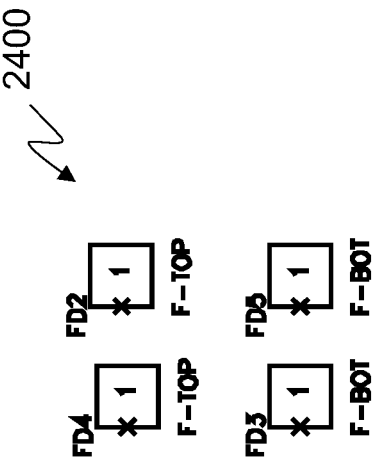
FIG. 24M is a schematic diagram of a further portion of example circuitry that can be used for the drive system of FIG. 22.
Figure 24L:
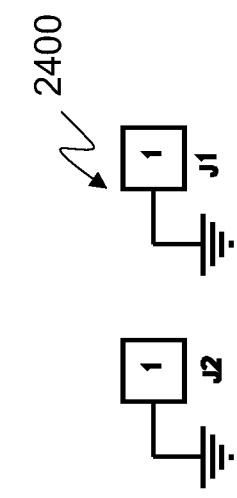
FIG. 24L is a schematic diagram of a further portion of example circuitry that can be used for the drive system of FIG. 22.
Figure 24N:
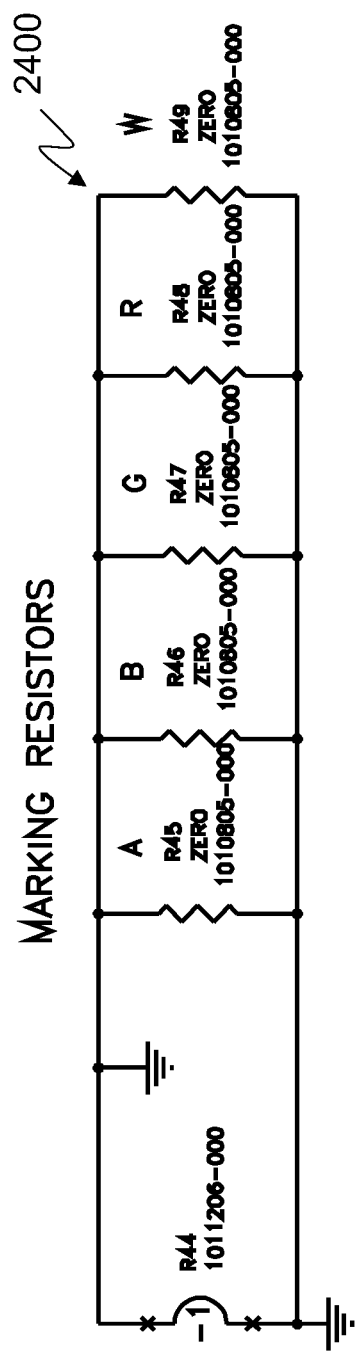
FIG. 24N is a schematic diagram of a further portion of example circuitry that can be used for the drive system of FIG. 22.

FIGS. 24A through 24N show schematic diagrams of portions 2400 of example circuitry that can be used for the drive system 2200 of FIG. 22. Referring to FIGS. 24A through 24N, the circuitry portion 2402 can correspond to the switching power supply 2210 of FIG. 22, and the circuitry portions 2404, 2406, 2408, and 2410 represent each of four dual channel USB adjustable current-limited power switches that can correspond to the adjustable current-limited power switch 2220 of FIG. 22.

The two-step approach of setting the output voltage of the switcher 2210 just above the forward voltage of the LED followed by limiting the maximum current going to the emitter results in an advantageous drive circuit for a single LED. The ability to drive an individual LED emitter, thermally and electrically efficiently, while staying in the safe operating area of the LED, allows for the ability to do unique lighting, such as the flashing of individual emitters.

In the examples provided herein, the warning devices are computing devices. The computing device can include a controller having at least one central processing unit ("CPU"), a system memory, and a system bus that couples the system memory to the CPU. The system memory includes a random access memory ("RAM") and a read-only memory ("ROM"). The computing devices can further include a mass storage device. The mass storage device is able to store software instructions and data. One or more of these memories can be used to store one or more oscillating light patterns.

The mass storage device and its associated computer-readable data storage media provide non-volatile, non-transitory storage for the computing devices. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing devices.

According to various embodiments, the warning device may operate in a networked environment using logical connections to remote network devices through a network, such as a wireless network, the Internet, or another type of network. The computing devices may also include an input/output controller for receiving and processing input from a number of other devices, including a touch user interface display screen, or another type of input device. Similarly, the input/output controller may provide output to a touch user interface display screen or other type of output device.

As mentioned, the mass storage device and the RAM of the computing devices can store software instructions and data. The software instructions include an operating system suitable for controlling the operation of the computing devices. The mass storage device and/or the RAM also store software instructions, that when executed by the CPU, cause the computing devices to provide the functionality of the controller discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A warning device, comprising:
   a plurality of light sources forming an array, each light source having an associated optical axis;
   a plurality of reflectors, with at least one reflector being associated with each of the plurality of light sources; and
   a plurality of lenses, with at least one lens being associated with each of the plurality of light sources, each lens defining a principal axis with one of the reflectors;
   wherein the principal axis of one of the lenses and reflectors is tilted at a nonzero angle relative to the optical axis of the associated light source to collimate light and to direct the light from the associated light source to one of a plurality of far field light spots.

2. The warning device of claim 1, further comprising a two-stage drive circuit for each of the plurality of light sources.

3. The warning device of claim 2, wherein the two-stage drive circuit includes a switching power supply and an adjustable current-limited power switch.

4. The warning device of claim 1, wherein, for each reflector, a first portion of the reflector extends, relative to the optical axis of the associated light source, further than a second portion of the reflector.

5. The warning device of claim 1, wherein the principal axis is tilted at a non-zero angle relative to the optical axis of the associated light source in each of two perpendicular dimensions of a plane that is perpendicular to the optical axis.

6. The warning device of claim 1, wherein each of the plurality of lenses is positioned outside an associated reflector.

7. A warning device, comprising:
   at least one Light-Emitting Diode; and
   a two-stage drive circuit for the Light-Emitting Diode, the two-stage drive circuit including a switching power supply and an adjustable current-limited power switch, the switching power supply being configured to provide an output voltage that is greater than a maximum forward voltage for the Light-Emitting Diode and less than 1 Volt greater than the maximum forward voltage, the adjustable current-limited power switch being configured to limit a current through the Light-Emitting Diode generated by the output voltage to a maximum current for the Light-Emitting Diode.

8. The warning device of claim 7, wherein the switching power supply is configured to step down a direct current input voltage.

9. The warning device of claim 7, wherein the switching power supply is configured to provide the output voltage at about 0.2 Volt greater than the maximum forward voltage for the Light-Emitting diode.

* * * * *